US012657801B2

(12) United States Patent (10) Patent No.: US 12,657,801 B2
Ruan (45) Date of Patent: Jun. 16, 2026

(54) SYSTEMS AND METHODS FOR IMAGE RECONSTRUCTION

(71) Applicant: SHANGHAI UNITED IMAGING HEALTHCARE CO., LTD., Shanghai (CN)

(72) Inventor: Jian Ruan, Shanghai (CN)

(73) Assignee: SHANGHAI UNITED IMAGING HEALTHCARE CO., LTD., Shanghai (CN)

( * ) Notice: Subject to any disclaimer, the term of this patent is extended or adjusted under 35 U.S.C. 154(b) by 357 days.

(21) Appl. No.: 18/449,878

(22) Filed: Aug. 15, 2023

(65) Prior Publication Data

US 2023/0386102 A1      Nov. 30, 2023

Related U.S. Application Data

(63) Continuation of application No. PCT/CN2022/078092, filed on Feb. 25, 2022.

(30) Foreign Application Priority Data

Feb. 26, 2021    (CN) ......................... 202110219969.8

(51) Int. Cl.
  *G06T 12/30*        (2026.01)
  *G06T 5/50*        (2006.01)
  *G06T 7/30*        (2017.01)
(52) U.S. Cl.
  CPC ................ *G06T 12/30* (2026.01); *G06T 5/50* (2013.01); *G06T 7/30* (2017.01); *G06T 2207/20221* (2013.01)
(58) Field of Classification Search
  CPC .......... G06T 11/008; G06T 5/50; G06T 7/30; G06T 2207/20221; G06T 1/20;
                (Continued)

(56) References Cited

U.S. PATENT DOCUMENTS

2014/0085318 A1*   3/2014   Nadar ................ G01R 33/5608
                                                            345/502
2016/0259023 A1*   9/2016   Overall ................. G06T 11/206
                    (Continued)

FOREIGN PATENT DOCUMENTS

CN        104182606 A      12/2014
CN        111694789 A       9/2020
                    (Continued)

OTHER PUBLICATIONS

First Office Action in Chinese Application No. 202110219969.8 mailed on May 6, 2022, 21 pages.
International Search Report in PCT/CN2022/078092 mailed on May 19, 2022, 5 pages.
Written Opinion in PCT/CN2022/078092 mailed on May 19, 2022, 5 pages.
                    (Continued)

*Primary Examiner* — Jose L Couso
(74) *Attorney, Agent, or Firm* — METIS IP LLC

(57)            ABSTRACT
The present disclosure provides a system and method for image reconstruction. The method may include obtaining image raw data; determining, based on a complexity of a reconstruction task of the image raw data and processing capacities of one or more workstations, from the one or more workstations, one or more hardware resources for processing the image raw data; generating, based on the image raw data and the one or more hardware resources, one or more sub tasks of the reconstruction task; assigning the one or more sub tasks to the one or more hardware resources; obtaining one or more intermediate results corresponding to the one or more sub tasks, the one or more intermediate results being generated by the one or more hardware resources; and generating, based on the one or more intermediate results, a reconstruction result of the image raw data.

20 Claims, 15 Drawing Sheets

500

Obtaining image raw data                                501

Determining, based on a complexity of a reconstruction task of the image raw data and/or processing capacities of one or more workstations, from the one or more workstations, one or more hardware resources for processing the image raw data                503

Generating, based on the image raw data and/or the one or more hardware resources, one or more sub tasks of the reconstruction task                505

Assigning the one or more sub tasks to the one or more hardware resources                507

Obtaining one or more intermediate results corresponding to the one or more sub tasks, the one or more intermediate results being generated by the one or more hardware resources                509

Generating, based on the one or more intermediate results, a reconstruction result of the image raw data                511

(58) Field of Classification Search
CPC ............... G06T 2200/28; G06T 11/005; G06T 11/006; G06T 2211/40; G06T 2211/412; G06T 2211/416; G06T 2211/421; G06T 2211/424; G06T 2211/456; G06T 2211/428; G06T 7/0012; G06T 3/00; G06T 2207/10072; G06T 2207/10076; G06T 2207/10081; G06T 2207/10084; G06T 2207/10101; G06T 2207/10104; G06T 2207/10108; G06T 3/4046; G06T 5/60; G06T 9/002; G06T 2207/20076; G06T 2207/20081; G06T 2207/20084; G06F 9/5038; G06F 9/5055; G06F 9/5061; G06F 9/5083; G06F 18/214; G06F 18/22; G06F 18/241; G06F 18/24; G06F 18/2411; G06F 18/2415; G06F 30/27; A61B 6/032; A61B 6/5211; H04N 23/80; G06N 3/02; G06N 3/08–088; G06N 3/0445; G06N 3/0454; G06N 3/0464; G06N 3/4046; G06N 3/4053; G06N 7/00; G06N 7/01; G06N 20/00; G06K 7/1482; G06V 10/454; G06V 10/54; G06V 10/7764; G06V 10/774; G06V 10/82; G06V 10/84; G06V 20/41; G06V 30/18057; G06V 20/698; G06V 30/19173; G06V 30/194; Y10S 128/925
See application file for complete search history.

(56) References Cited

U.S. PATENT DOCUMENTS

| | | | |
|---|---|---|---|
| 2018/0197314 A1* | 7/2018 | De Man ................ | G06T 11/006 |
| 2019/0087986 A1* | 3/2019 | Spohn ................... | G16H 30/00 |
| 2020/0042359 A1 | 2/2020 | Zhang et al. | |
| 2020/0167973 A1* | 5/2020 | Xiong .................... | A61B 5/055 |
| 2020/0303060 A1* | 9/2020 | Haemel ................. | G06N 3/082 |
| 2021/0174501 A1* | 6/2021 | Takeshima ............... | G06T 5/50 |
| 2021/0343054 A1* | 11/2021 | Wang ................... | G06T 11/006 |
| 2023/0011644 A1* | 1/2023 | Zhao ................... | A61B 6/5282 |

FOREIGN PATENT DOCUMENTS

| | | |
|---|---|---|
| CN | 111724451 A | 9/2020 |
| CN | 112162835 A | 1/2021 |
| CN | 112286645 A | 1/2021 |
| WO | 2020133450 A1 | 7/2020 |
| WO | 2022179631 A1 | 9/2022 |

OTHER PUBLICATIONS

The Extended European Search Report in European Application No. 22758995.9 mailed on Jun. 27, 2024, 9 pages.
Arkaitz Ruiz-Alvarez et al., Toward Optimal Resource Provisioning for Cloud MapReduce and Hybrid Cloud Applications, 2014 IEEE/ACM International Symposium on Big Data Computing, 74-82, 2014.

* cited by examiner

200

112A

Obtaining Module
402

Hardware Resource Determining Module
404

Sub Task Generating Module
406

Assigning Module
408

Reconstruction Result Generating Module
410

112B

Obtaining Module
412

Processing Capacity Determining Module
414

Intermediate Result Generating Module
416

Transmitting Module
418

500

<u>600</u>

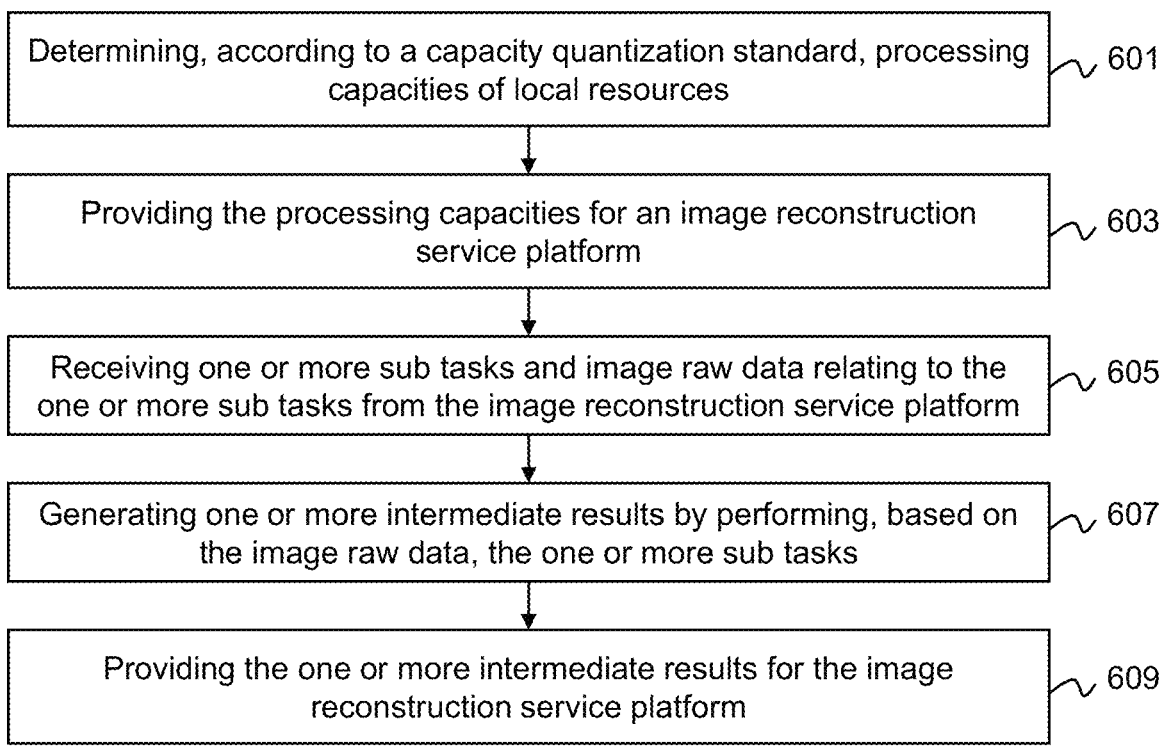

Determining, according to a capacity quantization standard, processing capacities of local resources ~ 601

Providing the processing capacities for an image reconstruction service platform ~ 603

Receiving one or more sub tasks and image raw data relating to the one or more sub tasks from the image reconstruction service platform ~ 605

Generating one or more intermediate results by performing, based on the image raw data, the one or more sub tasks ~ 607

Providing the one or more intermediate results for the image reconstruction service platform ~ 609

Setting one or more scan tasks and determining one or more reconstruction strategies ⟶ 1201

Detecting local and/or remote hardware resources ⟶ 1203

Determining a reconstruction task and allocating sub tasks ⟶ 1205

Managing intermediate results and generating a reconstruction result ⟶ 1207

<u>1300</u>

| | |
|---|---|
| Determining a price based on hardware resources and/or network resources | 1301 |
| Providing processing capacities, availabilities and/or accessibilities of the hardware resources | 1303 |
| Receiving one or more sub tasks and image raw data relating to the sub tasks | 1305 |
| Providing intermediate results corresponding to the sub tasks | 1307 |

1400

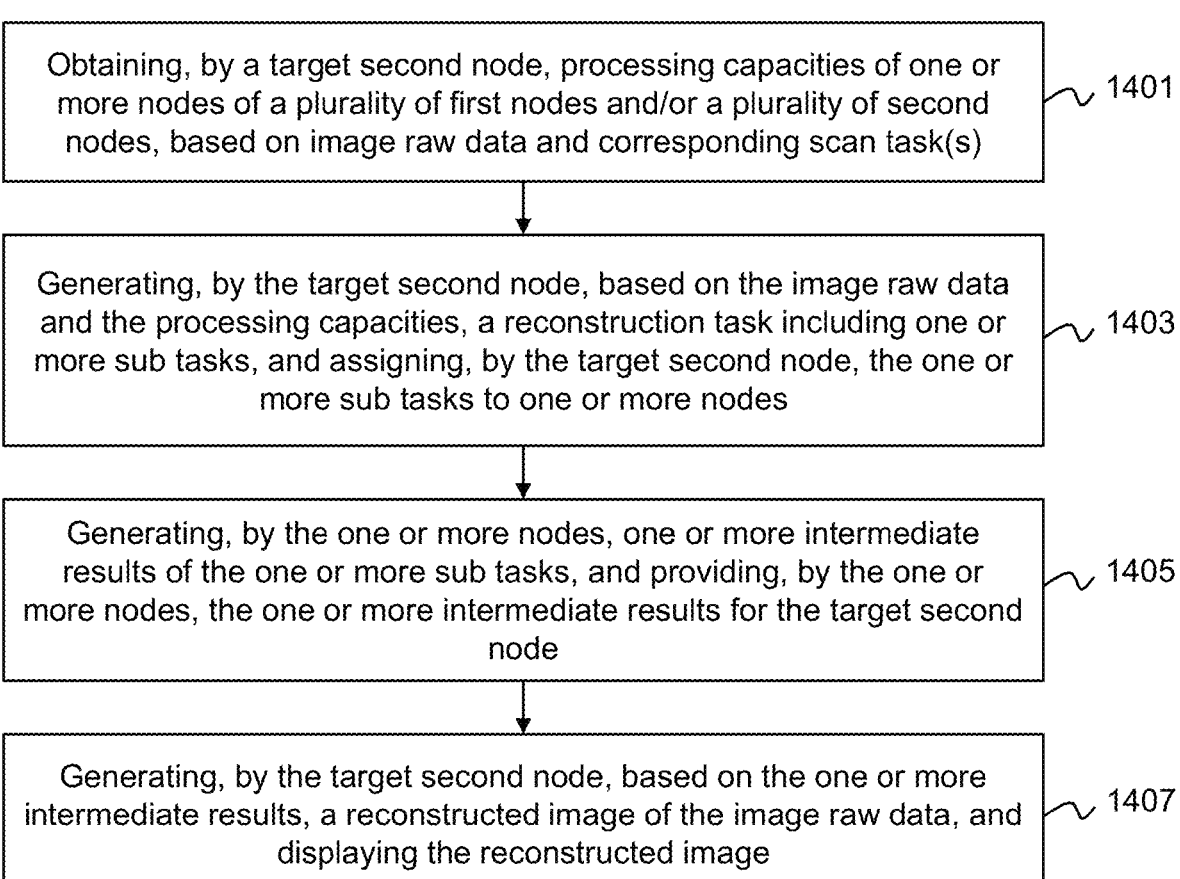

Obtaining, by a target second node, processing capacities of one or more nodes of a plurality of first nodes and/or a plurality of second nodes, based on image raw data and corresponding scan task(s) ~ 1401

Generating, by the target second node, based on the image raw data and the processing capacities, a reconstruction task including one or more sub tasks, and assigning, by the target second node, the one or more sub tasks to one or more nodes ~ 1403

Generating, by the one or more nodes, one or more intermediate results of the one or more sub tasks, and providing, by the one or more nodes, the one or more intermediate results for the target second node ~ 1405

Generating, by the target second node, based on the one or more intermediate results, a reconstructed image of the image raw data, and displaying the reconstructed image ~ 1407

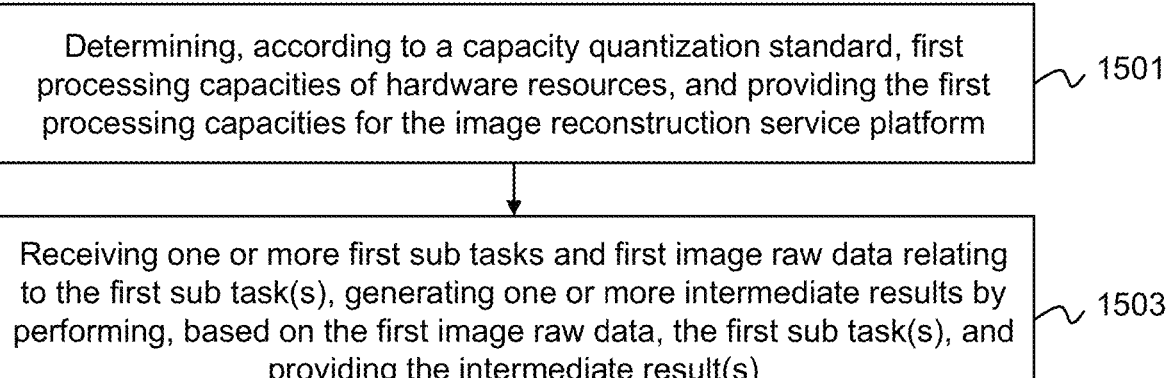

Determining, according to a capacity quantization standard, first processing capacities of hardware resources, and providing the first processing capacities for the image reconstruction service platform — 1501

Receiving one or more first sub tasks and first image raw data relating to the first sub task(s), generating one or more intermediate results by performing, based on the first image raw data, the first sub task(s), and providing the intermediate result(s) — 1503

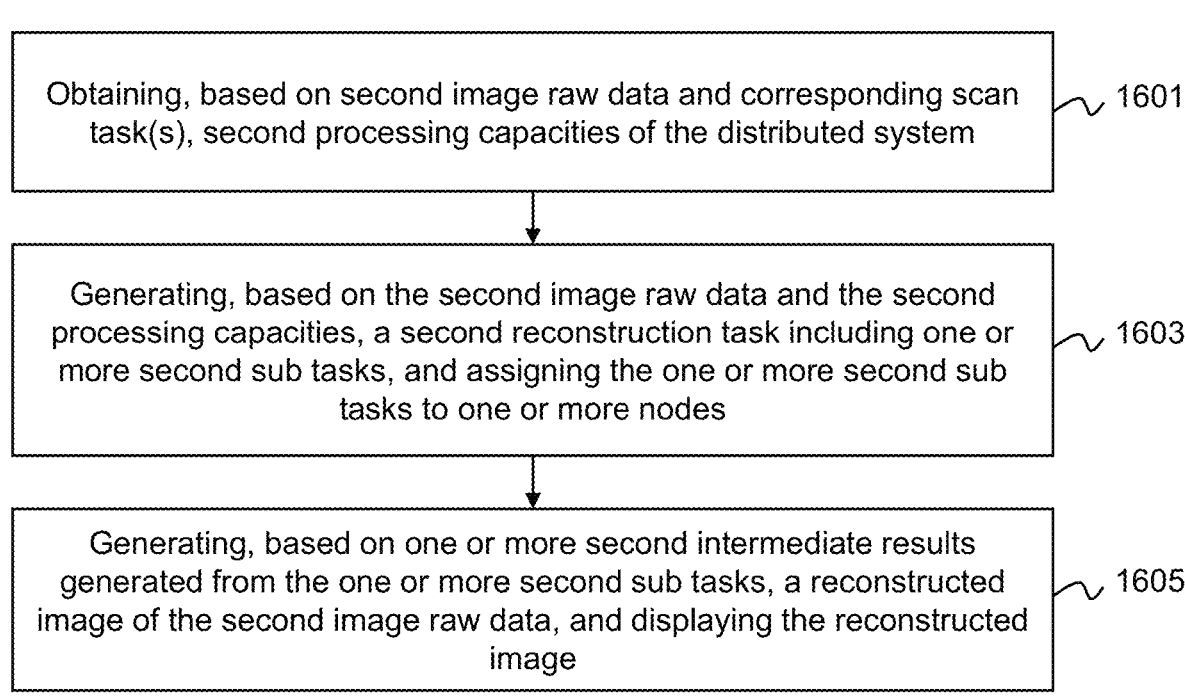

Obtaining, based on second image raw data and corresponding scan task(s), second processing capacities of the distributed system — 1601

Generating, based on the second image raw data and the second processing capacities, a second reconstruction task including one or more second sub tasks, and assigning the one or more second sub tasks to one or more nodes — 1603

Generating, based on one or more second intermediate results generated from the one or more second sub tasks, a reconstructed image of the second image raw data, and displaying the reconstructed image — 1605

FIG. 16

SYSTEMS AND METHODS FOR IMAGE RECONSTRUCTION

CROSS-REFERENCE TO RELATED APPLICATIONS

This application is a Continuation of International Application No. PCT/CN2022/078092, filed on Feb. 25, 2022, which claims priority of Chinese Patent Application No. 202110219969.8, filed on Feb. 26, 2021, and the contents of each of which are hereby incorporated by reference.

TECHNICAL FIELD

The present disclosure generally relates to image processing, and in particular, to systems and methods for image reconstruction.

BACKGROUND

Imaging devices generally include a first portion for data acquisition and transmission, and a second portion for data processing (e.g., image reconstruction). Efficient image reconstruction generally needs high-performance processing devices. Rapid development of imaging devices puts forward higher requirements for the processing devices, increasing the cost and/or power consumption of the processing devices. Therefore, it is desired to provide systems and methods for reconstructing images efficiently and with low cost.

SUMMARY

According to one aspect of the present disclosure, a method for image reconstruction is provided. The method may include one or more of the following operations: obtaining image raw data; determining, based on a complexity of a reconstruction task of the image raw data and processing capacities of one or more workstations, from the one or more workstations, one or more hardware resources for processing the image raw data; generating, based on the image raw data and the one or more hardware resources, one or more sub tasks of the reconstruction task; assigning the one or more sub tasks to the one or more hardware resources; obtaining one or more intermediate results corresponding to the one or more sub tasks, the one or more intermediate results being generated by the one or more hardware resources; and generating, based on the one or more intermediate results, a reconstruction result of the image raw data.

According to one aspect of the present disclosure, a method for image reconstruction is provided. The method may include one or more of the following operations: determining, according to a capacity quantization standard, processing capacities of local resources; providing the processing capacities for an image reconstruction service platform; receiving one or more sub tasks and image raw data relating to the one or more sub tasks from the image reconstruction service platform; generating one or more intermediate results by performing, based on the image raw data, the one or more sub tasks; and providing the one or more intermediate results for the image reconstruction service platform.

According to one aspect of the present disclosure, a method for image reconstruction is provided. The method may include one or more of the following operations: obtaining, by a target second node of the plurality of second nodes, first standardized processing capacities of one or more nodes of the plurality of first nodes and/or the plurality of second nodes, based on first image raw data generated by an image scanning process, wherein the target second node has a service request for image reconstruction; generating, by the target second node, based on the first image raw data and the first standardized processing capacities, a first reconstruction task including one or more first sub tasks; assigning, by the target second node, the one or more first sub tasks to at least a portion of the one or more nodes; receiving, by the at least a portion of the one or more nodes, the one or more first sub tasks and the first image raw data; generating, by the at least a portion of the one or more nodes, one or more first intermediate results by performing, based on the first image raw data, the one or more first sub tasks; and providing, by the at least a portion of the one or more nodes, the one or more first intermediate results for the target second node.

According to another aspect of the present disclosure, a system for image reconstruction is provided. The system may include an image reconstruction service platform, a plurality of service receiver nodes, and a plurality of service provider nodes. The image reconstruction service platform may be configured to: obtain, from at least one of the plurality of service receiver nodes, image raw data; determine, based on a complexity of a reconstruction task of the image raw data, processing capacities of the plurality of service receiver nodes, and processing capacities of the plurality of service provider nodes, from the plurality of service receiver nodes and the plurality of service provider nodes, one or more hardware resources for processing the image raw data; determine, based on the image raw data and the one or more hardware resources, one or more sub tasks of the reconstruction task; assign the one or more sub tasks to the one or more hardware resources; obtain one or more intermediate results corresponding to the one or more sub tasks, the one or more intermediate results being generated by the one or more hardware resources; and generate, based on the one or more intermediate results, a reconstruction result of the image raw data.

According to another aspect of the present disclosure, an image reconstruction apparatus configured as a first node of a distributed system for image reconstruction is provided. The apparatus may include a computing device, and a service platform implemented on the computing device. The service platform may include a hardware resource management module, configured to determine, according to a capacity quantization standard, first standardized processing capacities of hardware resources available for the service platform; and a control and data transmission interface, configured to receive one or more first sub tasks and first image raw data, generate one or more first intermediate results corresponding to the one or more first sub tasks, and provide the one or more first intermediate results. The one or more first sub tasks may include a sub task assigned by a second node of the distributed system, and the first image raw data may include image raw data transmitted from the second node.

According to another aspect of the present disclosure, a system for image reconstruction is provided. The system may include at least two second nodes that are in communication with each other; or at least one second node and a plurality of first nodes. Each first node of the plurality of first nodes or each second node may include an apparatus including: a computing device, and a service platform implemented on the computing device. The service platform may include a hardware resource management module, configured to determine, according to a capacity quantization standard, first standardized processing capacities of hardware resources available for the service platform; and a control and data transmission interface, configured to receive one or more first sub tasks and first image raw data, generate one or more first intermediate results corresponding to the one or more first sub tasks, and provide the one or more first intermediate results. The each second node may further include a reconstruction and display module in communication with the hardware resource management module of the each second node and the control and data transmission interface of the each second node. The control and data transmission interface of the each second node may be further configured to receive second image raw data. The reconstruction and display module may be configured to obtain, based on the second image raw data, second standardized processing capacities of the distributed system through the hardware resource management module of the each second node.

According to another aspect of the present disclosure, a system for operating an image reconstruction service platform to interact with service receiver nodes and service provider nodes is provided. The system may include a bus; a storage medium electronically connected to the bus and storing a set of instructions for image reconstruction; logic circuits electronically connected to the storage medium. When executing the set of instructions, the logic circuits may be directed to conduct logic operations including: obtaining image raw data; determining, based on a complexity of a reconstruction task of the image raw data and processing capacities of one or more workstations, from the one or more workstations, one or more hardware resources for processing the image raw data; generating, based on the image raw data and the one or more hardware resources, one or more sub tasks of the reconstruction task; assigning the one or more sub tasks to the one or more hardware resources; obtaining one or more intermediate results corresponding to the one or more sub tasks, the one or more intermediate results being generated by the one or more hardware resources; and generating, based on the one or more intermediate results, a reconstruction result of the image raw data.

According to another aspect of the present disclosure, a system for operating an image reconstruction service platform to interact with service receiver nodes and service provider nodes is provided. The system may include a bus; a storage medium electronically connected to the bus and storing a set of instructions for image reconstruction; logic circuits electronically connected to the storage medium. When executing the set of instructions, the logic circuits may be directed to conduct logic operations including: determining, according to a capacity quantization standard, processing capacities of local resources; providing the processing capacities for an image reconstruction service platform; receiving one or more sub tasks and image raw data relating to the one or more sub tasks from the image reconstruction service platform; generating one or more intermediate results by performing, based on the image raw data, the one or more sub tasks; and providing the one or more intermediate results for the image reconstruction service platform.

According to another aspect of the present disclosure, a system for operating an image reconstruction service platform to interact with service receiver nodes and service provider nodes is provided. The system may include a bus; a storage medium electronically connected to the bus and storing a set of instructions for image reconstruction; logic circuits electronically connected to the storage medium. When executing the set of instructions, the logic circuits may be directed to conduct logic operations including: obtaining, by a target second node of the plurality of second nodes, first standardized processing capacities of one or more nodes of the plurality of first nodes and/or the plurality of second nodes, based on first image raw data generated by an image scanning process, wherein the target second node has a service request for image reconstruction; generating, by the target second node, based on the first image raw data and the first standardized processing capacities, a first reconstruction task including one or more first sub tasks; assigning, by the target second node, the one or more first sub tasks to at least a portion of the one or more nodes; receiving, by the at least a portion of the one or more nodes, the one or more first sub tasks and the first image raw data; generating, by the at least a portion of the one or more nodes, one or more first intermediate results by performing, based on the first image raw data, the one or more first sub tasks; and providing, by the at least a portion of the one or more nodes, the one or more first intermediate results for the target second node.

According to one aspect of the present disclosure, a non-transitory computer readable medium is provided. The non-transitory computer readable medium stores instructions, the instructions, when executed by at least one processor, causing the at least one processor to implement a method comprising: obtaining image raw data; determining, based on a complexity of a reconstruction task of the image raw data and processing capacities of one or more workstations, from the one or more workstations, one or more hardware resources for processing the image raw data; generating, based on the image raw data and the one or more hardware resources, one or more sub tasks of the reconstruction task; assigning the one or more sub tasks to the one or more hardware resources; obtaining one or more intermediate results corresponding to the one or more sub tasks, the one or more intermediate results being generated by the one or more hardware resources; and generating, based on the one or more intermediate results, a reconstruction result of the image raw data.

According to one aspect of the present disclosure, a non-transitory computer readable medium is provided. The non-transitory computer readable medium stores instructions, the instructions, when executed by at least one processor, causing the at least one processor to implement a method comprising: determining, according to a capacity quantization standard, processing capacities of local resources; providing the processing capacities for an image reconstruction service platform; receiving one or more sub tasks and image raw data relating to the one or more sub tasks from the image reconstruction service platform; generating one or more intermediate results by performing, based on the image raw data, the one or more sub tasks; and providing the one or more intermediate results for the image reconstruction service platform.

According to one aspect of the present disclosure, a non-transitory computer readable medium is provided. The non-transitory computer readable medium stores instructions, the instructions, when executed by at least one processor, causing the at least one processor to implement a method comprising: obtaining, by a target second node of the plurality of second nodes, first standardized processing capacities of one or more nodes of the plurality of first nodes and/or the plurality of second nodes, based on first image raw data generated by an image scanning process, wherein the target second node has a service request for image reconstruction; generating, by the target second node, based on the first image raw data and the first standardized processing capacities, a first reconstruction task including one or more first sub tasks; assigning, by the target second node, the one or more first sub tasks to at least a portion of the one or more nodes; receiving, by the at least a portion of the one or more nodes, the one or more first sub tasks and the first image raw data; generating, by the at least a portion of the one or more nodes, one or more first intermediate results by performing, based on the first image raw data, the one or more first sub tasks; and providing, by the at least a portion of the one or more nodes, the one or more first intermediate results for the target second node.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 6 is a flowchart illustrating another exemplary process for image reconstruction according to some embodiments of the present disclosure;

FIG. 14 is a flowchart illustrating an exemplary process for image reconstruction according to some embodiments of the present disclosure;

FIG. 15 is a flowchart illustrating an exemplary process for image reconstruction according to some embodiments of the present disclosure; and FIG. 16 is a flowchart illustrating an exemplary process for image reconstruction according to some embodiments of the present disclosure.

DETAILED DESCRIPTION

Figure 1:
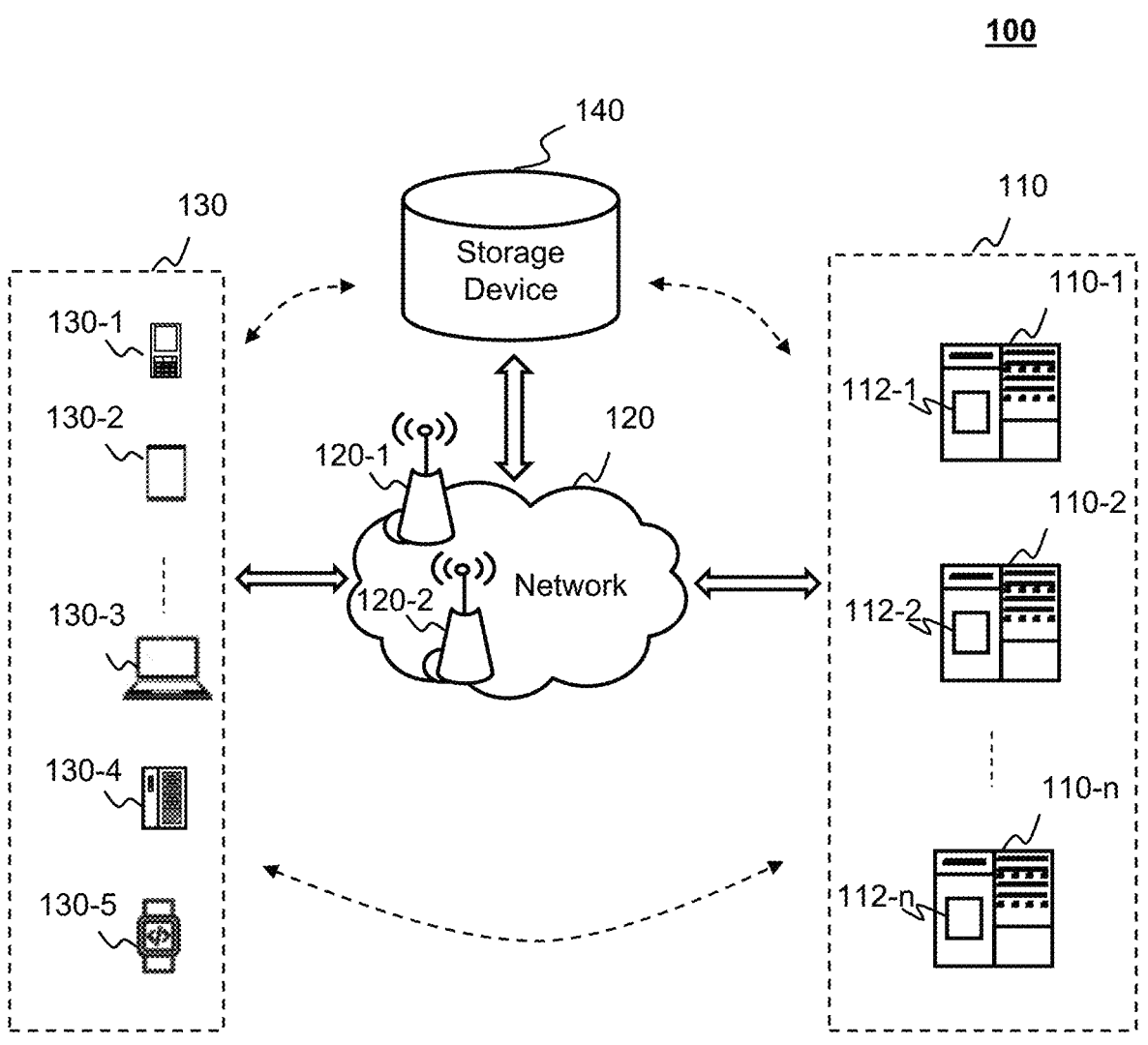
FIG. 1 is a schematic diagram illustrating an exemplary image reconstruction system according to some embodiments of the present disclosure.

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. Also, the term "exemplary" is intended to refer to an example or illustration.

It will be understood that, although the terms "first," "second," "third," etc., may be used herein to describe various elements, these elements should not be limited by these terms. These terms are only used to distinguish one element from another. For example, a first element could be termed a second element, and, similarly, a second element could be termed a first element, without departing from the scope of exemplary embodiments of the present disclosure.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

An aspect of the present disclosure relates to systems and methods for image reconstruction. According to some systems and methods of the present disclosure, a processing device may obtain image raw data; determine, based on a complexity of a reconstruction task of the image raw data and processing capacities of one or more workstations, from the one or more workstations, one or more hardware resources for processing the image raw data; generate, based on the image raw data and the one or more hardware resources, one or more sub tasks of the reconstruction task; assign the one or more sub tasks to the one or more hardware resources; obtain one or more intermediate results corresponding to the one or more sub tasks, the one or more intermediate results being generated by the one or more hardware resources; and generate, based on the one or more intermediate results, a reconstruction result of the image raw data.

According to the systems and methods of the present disclosure: (1) image raw data acquisition and data processing can be decoupled, a service receiver that has a need for image reconstruction can use hardware resources from a plurality of service providers, the service receiver may have no need to configure hardware resources of a workstation of its own according to a maximum processing capacity, thereby reducing the cost for configuring the workstation, and increasing the utilization rate of the hardware resources of service providers; (2) the processing capacities of workstations can be determined based on a capacity quantization standard, and hardware resources corresponding to different imaging devices can be modularized, thereby facilitating cooperation with different hardware resources, realizing hardware resource sharing between different workstations of imaging devices, and further increasing the utilization rate of the hardware resources; (3) a dynamic pricing mechanism can be used in the system, and service prices of service providers can be dynamically determined, thereby increasing the applicability and flexibility of the system; (4) the hardware resources of the service providers can be modularized or non-modularized, thereby increasing the universality, openness, extendibility of the system; (5) the system can provide a platform for sharing hardware resources, as well as a platform for sharing reconstructed images; (6) the system can provide a reconstruction and display module for displaying reconstructed images, thereby facilitating the system to determine individual scanning strategies that are adaptive to a displaying interface of the reconstruction and display module, and improving the display effect of the reconstructed images.

FIG. 1 is a schematic diagram illustrating an exemplary image reconstruction system according to some embodiments of the present disclosure. In some embodiments, the image reconstruction system 100 may be configured to reconstruct one or more images. Exemplary image reconstruction process may include image generation (e.g., reconstructing one or more images based on image raw data), removing an image artifact, image registration, image fusion, image denoising, or the like, or a combination thereof. In some embodiments, the image reconstruction system 100 may include one or more servers 110, a network 120, one or more terminal devices 130, and one or more storage devices 140. The components in the image reconstruction system 100 may be connected in one or more of various ways. Merely by way of example, the storage device 140 may be connected to the server 110 directly (as indicated by the bi-directional arrow in dotted lines linking the storage device 140 and the server 110) or through the network 120. As another example, the server 110 may be connected to the terminal device 130 directly (as indicated by the bi-directional arrow in dotted lines linking the server 110 and the terminal device 130) or through the network 120. As still another example, the terminal device 130 may be connected to the storage device 140 directly (as indicated by the bi-directional arrow in dotted lines linking the terminal device 130 and the storage device 140) or through the network 120.

In some embodiments, the server 110 may be a single server or a server group. The server group may be centralized or distributed (e.g., the server 110 may be a distributed system). In some embodiments, the server 110 may be local or remote. For example, the server 110 may access information and/or data stored in the terminal device 130 and/or the storage device 140 via the network 120. As another example, the server 110 may be directly connected to the terminal device 130 and/or the storage device 140 to access stored information and/or data. In some embodiments, the server 110 may be implemented on a cloud platform or an onboard computer. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 110 may be implemented on a computing device 200 including one or more components illustrated in FIG. 2 in the present disclosure.

In some embodiments, the servers 110 may include one or more servers such as a server 110-1, a server 110-2, . . . , a server 110-$n$. The servers 110 may be configured to perform one or more functions for data acquisition, hardware resource determination, sub task generation, sub task assigning, image reconstruction, or the like, or any combination thereof, independently or jointly. Merely by way of example, the servers 110 may include one or more service receivers (or second nodes), one or more service providers (or first nodes), etc.

In some embodiments, the servers 110 may include one or more processing devices 112. As shown in FIG. 1, the server 110-1 may include a processing device 112-1, the server 110-2 may include a processing device 112-2, . . . , and the server 110-$n$ may include a processing device 112-$n$. The processing devices 112 may process information and/or data stored in the storage devices (e.g., the storage device 140) and/or generated (or provided) by the terminal device 130 to perform one or more functions described in the present disclosure. In some embodiments, the processing devices 112 may include one or more processing engines (e.g., single-core processing engine(s) or multi-core processor(s)). Merely by way of example, the processing devices 112 may include a Central Processing Unit (CPU), an Application-Specific Integrated Circuit (ASIC), an Application-Specific Instruction-set Processor (ASIP), a Graphics Processing Unit (GPU), a Physics Processing Unit (PPU), a Digital Signal Processor (DSP), a Field Programmable Gate Array (FPGA), a Programmable Logic Device (PLD), a controller, a microcontroller unit, a Reduced Instruction-Set Computer (RISC), a microprocessor, or the like, or any combination thereof.

In some embodiments, at least a portion of the servers 110 may be connected to the network 120 to communicate with one or more components (e.g., the terminal device 130, the storage device 140) of the image reconstruction system 100. In some embodiments, at least a portion of the servers 110 may be directly connected to or communicate with one or more components (e.g., the terminal device 130, the storage device 140) of the image reconstruction system 100.

The network 120 may facilitate exchange of information and/or data. In some embodiments, one or more components (e.g., the server 110, the terminal device 130, or the storage device 140) of the image reconstruction system 100 may send information and/or data to other component(s) of the image reconstruction system 100 via the network 120. For example, the terminal device 130 may transmit image raw data to the server 110 via the network 120. As another example, the processing device 112 may receive image raw data transmitted by the terminal device 130 via the network 120. As still another example, the processing device 112 may obtain image raw data from the storage device 140 via the network 120. As still another example, the storage device 140 may obtain reconstructed image(s) for storing from the server 110 via the network 120. As still another example, the processing device 112 may receive a request for image reconstruction from the terminal device 130 via the network 120. As still another example, the processing device 112 may send one or more sub tasks, one or more intermediate results, and/or one or more reconstructed images to the terminal device 130 via the network 120. In some embodiments, the network 120 may be any type of wired or wireless network, or combination thereof. Merely by way of example, the network 120 may include a cable network, a wireline network, an optical fiber network, a tele communications network, an intranet, an Internet, a Local Area Network (LAN), a Wide Area Network (WAN), a Wireless Local Area Network (WLAN), a Metropolitan Area Network (MAN), a Public Telephone Switched Network (PSTN), a Bluetooth network, a ZigBee network, a Near Field Communication (NFC) network, or the like, or any combination thereof. In some embodiments, the network 120 may include one or more network access points. For example, the network 120 may include wired or wireless network access points, through which one or more components of the image reconstruction system 100 may be connected to the network 120 to exchange data and/or information.

In some embodiments, the terminal device(s) 130 may include a mobile device 130-1, a tablet computer 130-2, a laptop computer 130-3, a computing device 130-4 connected to an imaging device, a wearable device 130-5, or the like, or any combination thereof. In some embodiments, the mobile device 130-1 may include a smart home device, a smart mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the smart mobile device may include a smartphone, a Personal Digital Assistance (PDA), a gaming device, a navigation device, a Point of Sale (POS) device, or the like, or any combination thereof. In some embodiments, the virtual reality device and/or the augmented reality device may include a virtual reality helmet, virtual reality glasses, a virtual reality patch, an augmented reality helmet, augmented reality glasses, an augmented reality patch, or the like, or any combination thereof. For example, the virtual reality device and/or the augmented reality device may include Google™ Glasses, an Oculus Rift™, a HoloLens™, a Gear VR™, etc. In some embodiments, the computing device 130-4 may include a console computer connected to an imaging device. In some embodiments, the wearable device 130-5 may include a smart bracelet, a smart footgear, smart glasses, a smart helmet, a smart watch, smart clothing, a smart backpack, a smart accessory, or the like, or any combination thereof. In some embodiments, the server 110 may be integrated into the terminal device(s) 130.

The terminal device(s) 130 may be configured to facilitate communications between a user (e.g., an engineer, a doctor, a technician) and the image reconstruction system 100. For example, the user may send a data request via the terminal device 130 to the image reconstruction system 100. As another example, the user may retrieve and/or download data and/or information stored in one or more storage devices of the image reconstruction system 100 via the terminal device 130. As still another example, the user may retrieve or download data of interest by logging in an application coupled with (or that can communicate with) the image reconstruction system 100 via the terminal device 130. In some embodiments, the application coupled with the image reconstruction system 100 may facilitate the processing and/or management of data generated (or provided) by the terminal device 130 and/or stored in the storage device 140. In some embodiments, the application may provide a data access interface for one or more users of the data, so that the user(s) may retrieve or download data of interest via the application for further use of the data.

The storage device 140 may store data and/or instructions. In some embodiments, the storage device 140 may store data obtained from the terminal device 130, such as a data request. In some embodiments, the storage device 140 may store image raw data. For example, the storage device 140 may store image raw data obtained from an imaging device. In some embodiments, the storage device 140 may store data generated or processed by the server 110. For example, the server 110 may reconstruct, based on the image data, to obtain reconstructed image(s), and/or the storage device 140 may store the reconstructed image(s). As another example, the server 110 may determine hardware resource for processing the image raw data, generate one or more sub tasks for image reconstruction, assign the one or more sub tasks to the hardware resources, obtain one or more intermediate results corresponding to the one or more sub tasks, and/or generating, based on the one or more intermediate results, a reconstruction result of the image raw data. In some embodiments, the storage device 140 may store data and/or instructions that the server 110 may execute or use to perform exemplary methods described in the present disclosure.

In some embodiments, the storage device 140 may be connected to the network 120 to communicate with one or more components (e.g., the server 110, terminal device 130) of the image reconstruction system 100. One or more components of the image reconstruction system 100 may access the data or instructions stored in the storage device 140 via the network 120. In some embodiments, the storage device 140 may be directly connected to or communicate with one or more components (e.g., the server 110, the terminal device 130) of the image reconstruction system 100. In some embodiments, at least a portion of the storage device 140 may be part of the server 110. In some embodiments, at least a portion of the storage device 140 may be integrated in the terminal device 130. In some embodiments, at least a portion of the storage devices 140 may be set in one or more IDCs. Merely for illustration, only one storage device is illustrated in the image reconstruction system 100. However, it should be noted that the image reconstruction system 100 in the present disclosure may also include multiple storage devices.

In some embodiments, the storage device 140 may include a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a Random Access Memory (RAM). Exemplary RAM may include a Dynamic RAM (DRAM), a Double Date Rate Synchronous Dynamic RAM (DDR SDRAM), a Static RAM (SRAM), a Thyrisor RAM (T-RAM), and a Zero-capacitor RAM (Z-RAM), etc. Exemplary ROM may include a Mask ROM (MROM), a Programmable ROM (PROM), an Erasable Programmable ROM (EPROM), an ELectrically-Erasable Programmable ROM (EEPROM), a Compact Disk ROM (CD-ROM), and a digital versatile disk ROM, etc. In some embodiments, the storage device 140 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

It should be noted that the image reconstruction system 100 is merely provided for the purposes of illustration, and is not intended to limit the scope of the present disclosure. For persons having ordinary skills in the art, multiple variations or modifications may be made under the teachings of the present disclosure. However, those variations and modifications do not depart from the scope of the present disclosure. For example, the image reconstruction system 100 may be implemented on other devices to realize similar or different functions. As another example, the storage device 140 may be omitted from the image reconstruction system 100.

Figure 2:
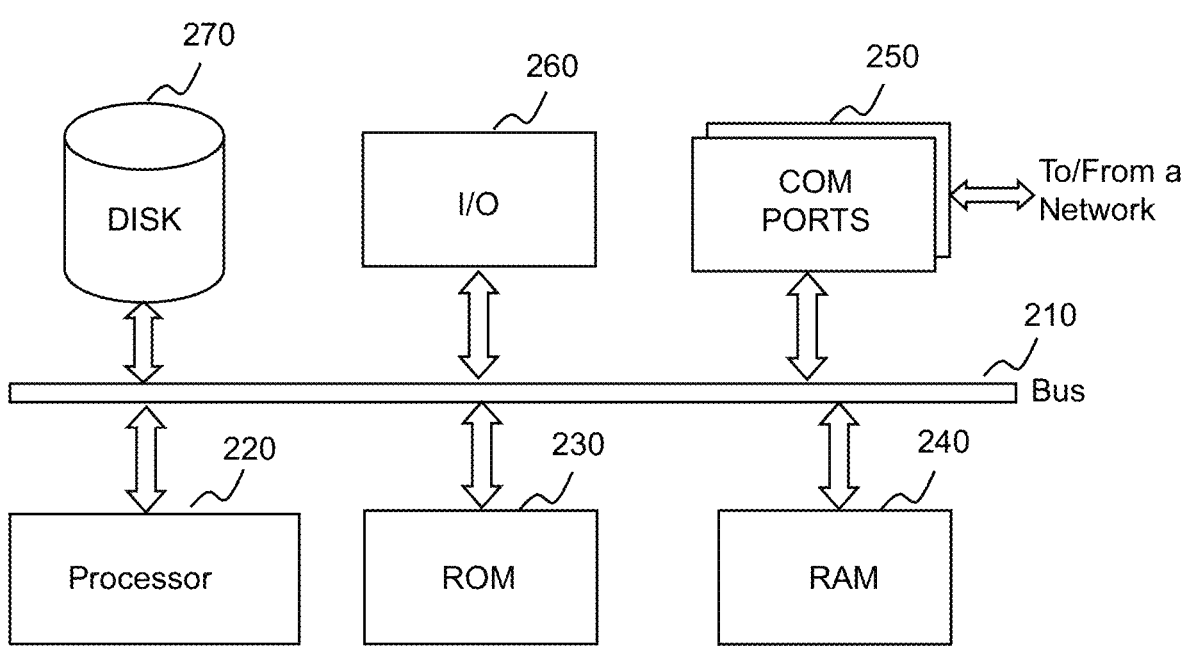
FIG. 2 is a schematic diagram illustrating exemplary hardware and/or software components of an exemplary computing device according to some embodiments of the present disclosure.

FIG. 2 is a schematic diagram illustrating exemplary hardware and/or software components of an exemplary computing device according to some embodiments of the present disclosure. In some embodiments, the server 110 may be implemented on the computing device 200. For example, the processing device 112 may be implemented on the computing device 200 and configured to perform functions of the processing device 112 disclosed in this disclosure.

The computing device 200 may be used to implement any component of the image reconstruction system 100 of the present disclosure. For example, the processing device 112 of the image reconstruction system 100 may be implemented on the computing device 200, via its hardware, software program, firmware, or a combination thereof. Although only one such computer is shown for convenience, the computer functions related to the image reconstruction system 100 as described herein may be implemented in a distributed manner on a number of similar platforms to distribute the processing load.

The computing device 200, for example, may include communication (COM) ports 250 connected to and from a network (e.g., the network 120) connected thereto to facilitate data communications. The computing device 200 may also include a processor (e.g., a processor 220), in the form of one or more processors (e.g., logic circuits), for executing program instructions. For example, the processor may include interface circuits and processing circuits therein. The interface circuits may be configured to receive electronic signals from a bus 210, wherein the electronic signals encode structured data and/or instructions for the processing circuits to process. The processing circuits may conduct logic calculations, and then determine a conclusion, a result, and/or an instruction encoded as electronic signals. Then the interface circuits may send out the electronic signals from the processing circuits via the bus 210.

The computing device 200 may further include program storage and data storage of different forms, for example, a disk 270, and a Read Only Memory (ROM) 230, or a Random Access Memory (RAM) 240, for storing various data files to be processed and/or transmitted by the computing device 200. The computing device 200 may also include program instructions stored in the ROM 230, the RAM 240, and/or other type of non-transitory storage medium to be executed by the processor 220. The methods and/or processes of the present disclosure may be implemented as the program instructions. The computing device 200 may also include an I/O component 260, supporting input/output between the computing device 200 and other components therein. The computing device 200 may also receive programming and data via network communications.

Merely for illustration, only one processor is described in the computing device 200. However, it should be noted that the computing device 200 in the present disclosure may also include multiple processors, and thus operations that are performed by one processor as described in the present disclosure may also be jointly or separately performed by the multiple processors. For example, the processor of the computing device 200 executes both operation A and operation B. As in another example, operation A and operation B may also be performed by two different processors jointly or separately in the computing device 200 (e.g., the first processor executes operation A and the second processor executes operation B, or the first and second processors jointly execute operations A and B).

Figure 3:
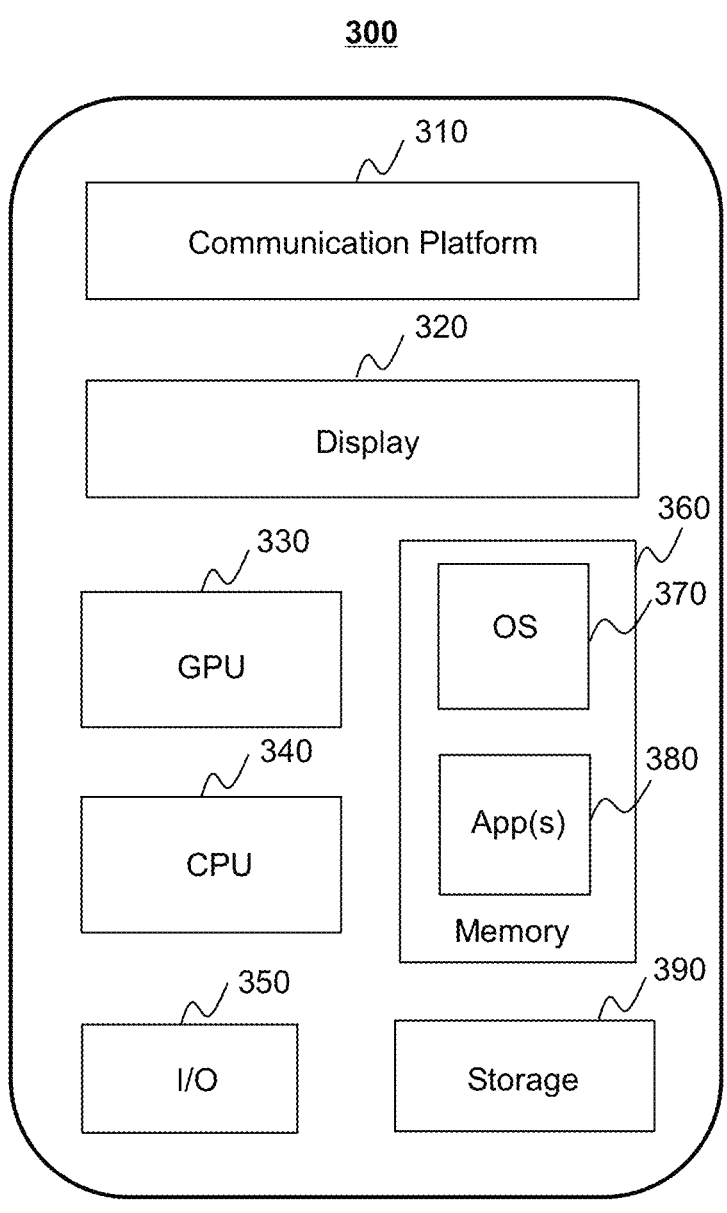
FIG. 3 is a block diagram illustrating an exemplary processing device according to some embodiments of the present disclosure.

FIG. 3 is a schematic diagram illustrating exemplary hardware and/or software components of an exemplary mobile device on which a terminal device may be implemented according to some embodiments of the present disclosure. As illustrated in FIG. 3, the mobile device 300 may include a communication platform 310, a display 320, a Graphic Processing Unit (GPU) 330, a Central Processing Unit (CPU) 340, an I/O 350, a memory 360, and storage 390. In some embodiments, any other suitable component, including but not limited to a system bus or a controller (not shown), may also be included in the mobile device 300. In some embodiments, a mobile operating system 370 (e.g., iOS™, Android™, Windows Phone™) and one or more applications 380 may be loaded into the memory 360 from the storage 390 in order to be executed by the CPU 340. The applications 380 may include a browser or any other suitable mobile apps for receiving and rendering information relating to image reconstruction or other information from the processing device 112. User interactions with the information stream may be achieved via the I/O 350 and provided to the processing device 112 and/or other components of the image reconstruction system 100 via the network 120.

To implement various modules, units, and their functionalities described in the present disclosure, computer hardware platforms may be used as the hardware platform(s) for one or more of the elements described herein. A computer with user interface elements may be used to implement a Personal Computer (PC) or any other type of work station or terminal device. A computer may also act as a server if appropriately programmed.

Figure 4A:
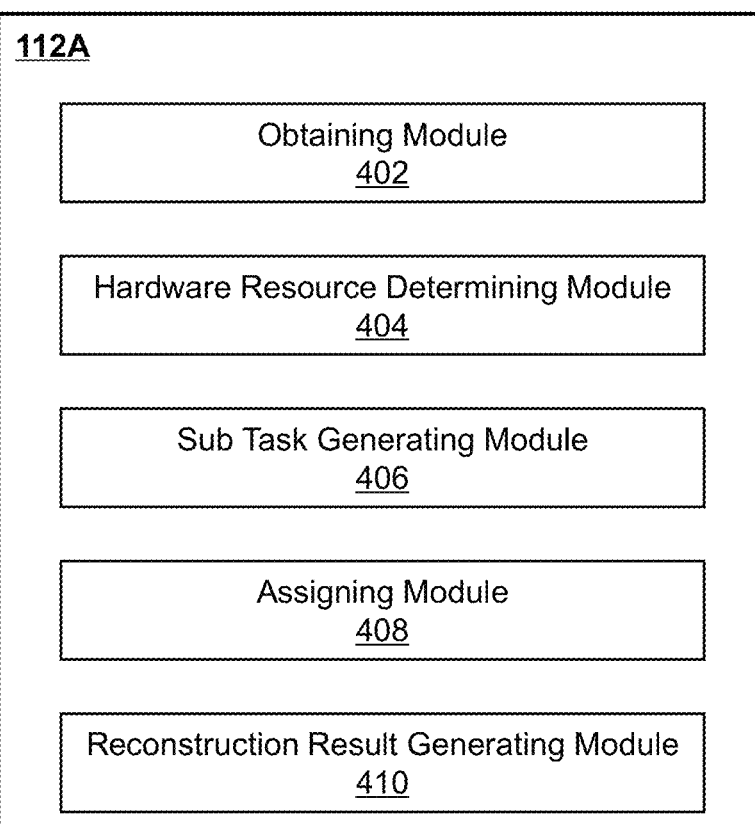
FIGS. 4A and 4B are block diagrams illustrating exemplary processing devices according to some embodiments of the present disclosure.
Figure 4B:
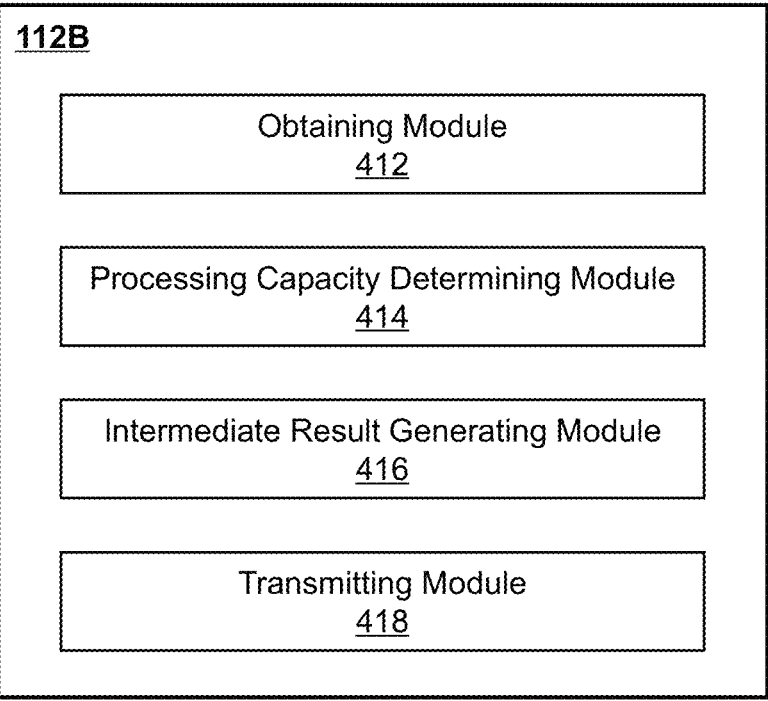

FIGS. 4A and 4B are block diagrams illustrating exemplary processing devices according to some embodiments of the present disclosure. In some embodiments, the processing device 112A and the processing device 112B may be embodiments of the processing device 112 as described in connection with FIG. 1. In some embodiments, the processing device 112A and the processing device 112B may be respectively implemented on a processing unit (e.g., the processor 220 illustrated in FIG. 2, or the CPU 340 as illustrated in FIG. 3). Merely by way of example, the processing device 112A may be implemented on the computing device 200 of a service receiver, and the processing device 112B may be implemented on the computing device 200 of a service provider. Alternatively, the processing device 112A and the processing device 112B may be implemented on the same computing device 200, or the same CPU 340.

In some embodiments, the image reconstruction system 100 may include an image reconstruction service platform, or the image reconstruction service platform may be coupled with the image reconstruction system 100. In some embodiments, the image reconstruction system 100 may further include one or more service receiver nodes, and/or one or more service provider nodes. The image reconstruction service platform may be configured to perform functions relating to image reconstruction disclosed in this disclosure. For example, the image reconstruction service platform may obtain, from at least one of the one or more service receiver nodes, image raw data; determine, based on a complexity of a reconstruction task of the image raw data, processing capacities of the one or more service receiver nodes, and/or processing capacities of the one or more service provider nodes, from the one or more service receiver nodes and the one or more service provider nodes, one or more hardware resources for processing the image raw data; determine, based on the image raw data and the one or more hardware resources, one or more sub tasks of a reconstruction task; assign the one or more sub tasks to the one or more hardware resources; obtain one or more intermediate results corresponding to the one or more sub tasks, in which the one or more intermediate results may be generated by the one or more hardware resources; generate, based on the one or more intermediate results, a reconstruction result of the image raw data. In some embodiments, each of the one or more service provider nodes may be configured to: determine, according to a capacity quantization standard, processing capacities of resources of the each service provider node; provide the processing capacities for the image reconstruction service platform; receive at least one of the one or more sub tasks and at least a portion of the image raw data relating to the at least one sub task from the image reconstruction service platform; generate at least one intermediate result by performing, based on the at least a portion of the image raw data, the at least one sub task; and/or provide the at least one intermediate result for the image reconstruction service platform. In some embodiments, the image reconstruction system 100 may be a distributed system. In some embodiments, the image reconstruction service platform may be implemented on the at least one of the one or more service receiver nodes. In some embodiments, the image reconstruction service platform may be implemented on the one or more service receiver nodes, and/or the one or more service provider nodes.

In some embodiments, the image reconstruction system 100 may include one or more workstations. In some embodiments, a workstation may be or include or correspond to (or coupled to) a node (e.g., a service receiver node (or a second node), a service provider node (or a first node)) of the image reconstruction system 100. In some embodiments, the workstation may provide hardware resources for the node. In some embodiments, a service receiver (node) may refer to a node that has a need or request for an image reconstruction service. In some embodiments, a service provider (node) may refer to a node that has an ability to provide one or more image reconstruction services or a portion thereof. In some embodiments, the workstation of a service provider (node) may include hardware resources for implementing image reconstruction programs to provide an image reconstruction service (or a portion thereof). In some embodiments, an image reconstruction service (or a portion thereof) of a service receiver (node) may be provided or achieved by the service receiver (node) itself. In some embodiments, an image reconstruction service (or a portion thereof) of a service receiver (node) may be provided or achieved by one or more service providers (nodes). In some embodiments, a service receiver (node) of a first image reconstruction service may also be a service provider (node) of a second image reconstruction service. In some embodiments, a service provider (node) of a third image reconstruction service may also be a service receiver (node) of a fourth image reconstruction service. For example, the workstation of a service provider (node) may provide image reconstruction services for different service receivers (nodes) at the same time.

In some embodiments, the image reconstruction service platform may be configured as a cloud computing platform. For example, the service receiver(s) (or node(s)), and/or the service provider(s) (or node(s)) may not be directly coupled to the image reconstruction service platform. Alternatively, the service receiver(s) (or node(s)), and/or the service provider(s) (or node(s)) may be in communication with the image reconstruction service platform via the network 120. In some embodiments, a service receiver (node) may transmit image raw data to the cloud platform. In some embodiments, the cloud platform may receive the image raw data, and determine, based on a complexity of a reconstruction task of the image raw data and/or processing capacities of one or more workstations, from the one or more workstations, one or more hardware resources for processing the image raw data. In some embodiments, the cloud platform may generate, based on the image raw data and/or the one or more hardware resources, one or more sub tasks of the reconstruction task. In some embodiments, the cloud platform may transmit the sub task(s) to the service receiver (node). In some embodiments, the service receiver (node) may assign the sub task(s) to the hardware resources. In some embodiments, the cloud platform may directly assign the sub task(s) to the hardware resources. In some embodiments, the cloud platform may obtain one or more intermediate results corresponding to the one or more sub tasks and generate, based on the one or more intermediate results, a reconstruction result of the image raw data. In some embodiments, the cloud platform may transmit the reconstruction result to the service receiver (node). In some embodiments, the service receiver (node) may directly obtain the one or more intermediate results from one or more service provider(s) (or node(s)), and generate the reconstruction result.

In some embodiments, the processing device 112A may be implemented on the computing device of a service receiver (e.g., a second node). In some embodiments, the processing device 112A may be coupled to a service receiver (node). In some embodiments, the computing device of a service receiver may be connected to or in communication with an imaging device. In some embodiments, the processing device 112B may be implemented on the computing device of a service provider (e.g., a first node). In some embodiments, the processing device 112B may be coupled to a service provider (node). In some embodiments, a service provider (node) may be coupled to a processing device 112B. In some embodiments, a service provider (node) may be coupled to a processing device 112A, or a service receiver (node) may be coupled to a processing device 112B. In this case, a node may be coupled to the processing device 112A and the processing device 112B at the same time (i.e., the node may be a service receiver and a service provider at the same time). In some embodiments, the image reconstruction service platform may control the processing device 112A and/or the processing device 112B to perform the functions relating to image reconstruction. In some embodiments, the processing device 112A may be a portion of the image reconstruction service platform. In some embodiments, the processing device 112B may be a portion of the image reconstruction service platform.

The processing device 112A of the server 110 may include an obtaining module 402, a hardware resource determining module 404, a sub task generating module 406, an assigning module 408, and a reconstruction result generating module 410.

The obtaining module 402 may obtain image raw data, and/or one or more intermediate results corresponding to one or more sub tasks. The hardware resource determining module 404 may determine, based on a complexity of a reconstruction task of the image raw data and processing capacities of one or more workstations, from the one or more workstations, one or more hardware resources for processing the image raw data. In some embodiments, the hardware resource determining module 404 may determine, based on an evaluation rule for matching the complexity of the reconstruction task of the image raw data and the processing capacities of one or more workstations, the one or more hardware resources. The sub task generating module 406 may generate, based on the image raw data and the one or more hardware resources, one or more sub tasks of the reconstruction task. The assigning module 408 may assign one or more sub tasks to one or more hardware resources. The reconstruction result generating module 410 may generate, based on one or more intermediate results, a reconstruction result of the image raw data. More descriptions of the obtaining module 402, the hardware resource determining module 404, the sub task generating module 406, the assigning module 408, and the reconstruction result generating module 410 may be found elsewhere in the present disclosure (e.g., FIG. 5 and the descriptions thereof).

The processing device 112B of the server 110 may include an obtaining module 412, a processing capacity determining module 414, an intermediate result generating module 416, and a transmitting module 418.

The obtaining module 412 may obtain (e.g., receive) one or more sub tasks and/or image raw data relating to the one or more sub tasks from an image reconstruction service platform. The processing capacity determining module 414 may determine, according to a capacity quantization standard, processing capacities of local resources. In some embodiments, the processing capacity determining module 414 may determine the processing capacities of local resources based on a bearing capacity of each of the local resources for each of a plurality of types of image reconstruction units of a plurality of image reconstruction algorithms. The intermediate result generating module 416 may generate one or more intermediate results by performing, based on the image raw data, the one or more sub tasks. The transmitting module 418 may provide the processing capacities, the one or more intermediate results, a service price, and/or availabilities and/or accessibilities of local resources for the image reconstruction service platform. More descriptions of the obtaining module 412, the processing capacity determining module 414, the intermediate result generating module 416, and the transmitting module 418 may be found elsewhere in the present disclosure (e.g., FIG. 6 and the descriptions thereof).

The modules in the processing device 112A and/or the processing device 112B may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. In some embodiments, the processing device 112A and the processing device 112B may be combined as a single processing device. In some embodiments, the processing device 112A and/or the processing device 112B may include one or more additional modules. For example, the processing device 112A may also include a transmitting module (not shown) configured to transmit data and/or information (e.g., image raw data, sub task(s)) to one or more components (e.g., the processing device 112B) of the image reconstruction system 100. As another example, the processing device 112A and/or the processing device 112B may include a storage module (not shown) used to store information and/or data associated with image reconstruction. As a further example, the processing device 112B may include a service price determining module configured to determine a service price. In some embodiments, two or more of the modules may be combined into a single module, and any one of the modules may be divided into two or more units. For example, the sub task generating module 406 and the assigning module 408 may be combined as a single module.

Figure 5:
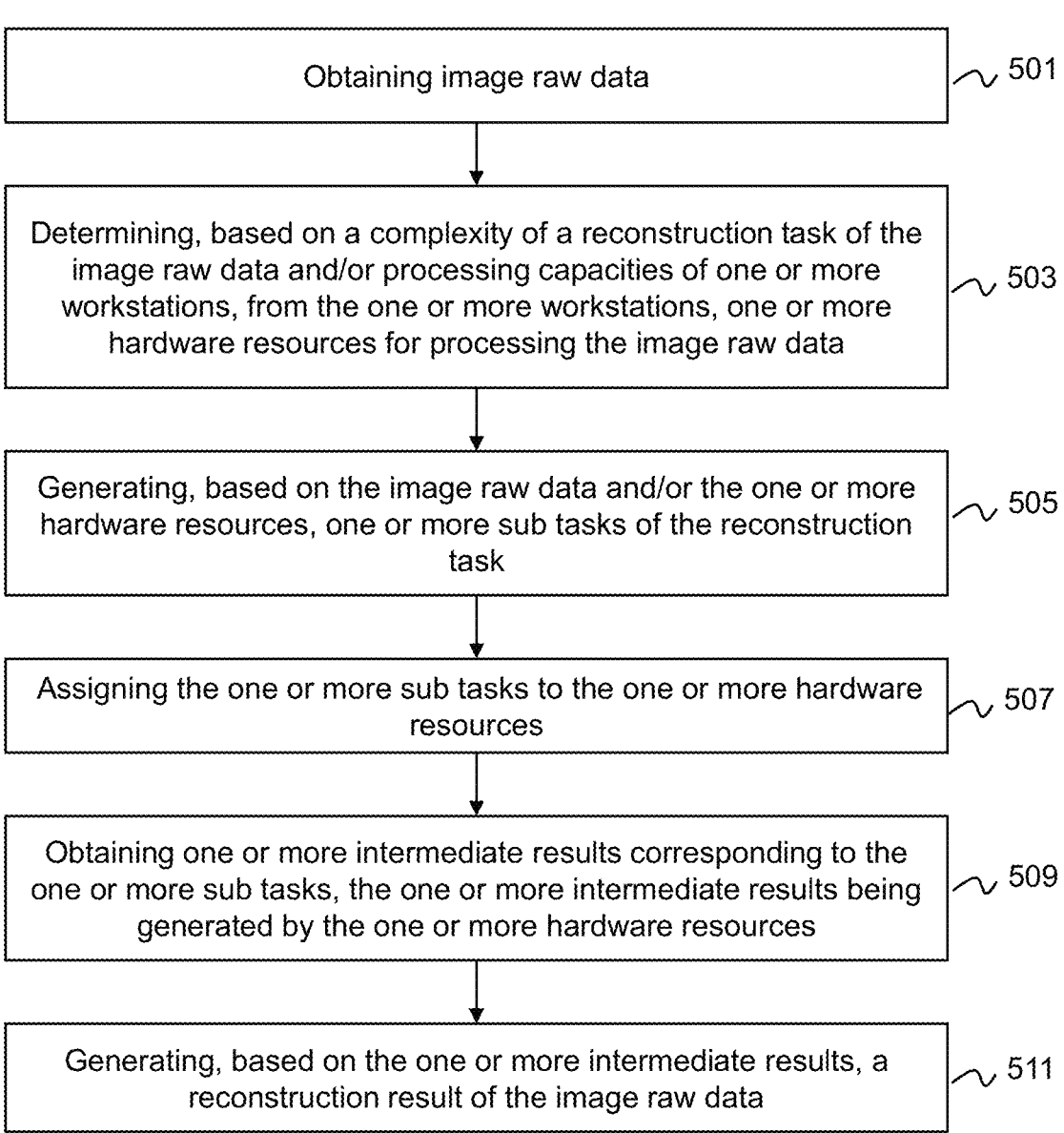
FIG. 5 is a flowchart illustrating an exemplary process for image reconstruction according to some embodiments of the present disclosure.

FIG. 5 is a flowchart illustrating an exemplary process for image reconstruction according to some embodiments of the present disclosure. In some embodiments, process 500 may be executed by the image reconstruction system 100. For example, the process 500 may be implemented as a set of instructions (e.g., an application) stored in a storage device (e.g., the storage device 140, the disk 270, and/or the storage 390). In some embodiments, the processing device 112A (e.g., the processor 220 of the computing device 200, the CPU 340 of the mobile device 300, and/or one or more modules illustrated in FIG. 4A) may execute the set of instructions and may accordingly be directed to perform the process 500. The operations of the illustrated process presented below are intended to be illustrative. In some embodiments, the process 500 may be accomplished with one or more additional operations not described and/or without one or more of the operations discussed. Additionally, the order of the operations of process 500 illustrated in FIG. 5 and described below is not intended to be limiting.

In 501, the processing device 112A (e.g., the obtaining module 402) may obtain image raw data.

As used herein, image raw data refers to raw data that is generated by an imaging device and is not processed. In some embodiments, the image raw data may be medical image raw data. For example, the image raw data may be associated with a specific portion (e.g., the head, the thorax, the abdomen), an organ (e.g., a lung, the liver, the heart, the stomach), and/or tissue (e.g., muscle tissue, connective tissue, epithelial tissue, nervous tissue) of a human or an animal.

In some embodiments, the imaging device (e.g., a first imaging device) that generates the image raw data may include a single modality imaging device. For example, the imaging device may include a Positron Emission Tomography (PET) device, a Single-Photon Emission Computed Tomography (SPECT) device, a Magnetic Resonance Imaging (MRI) device (also referred to as an MR device, or an MR scanner), a Computed Tomography (CT) device (e.g., a spiral CT, an electron beam CT, an energy spectrum CT), an Ultrasound (US) device, an X-ray imaging device, a Digital Subtraction Angiography (DSA) device, a Magnetic Resonance Angiography (MRA) device, a Computed Tomography Angiography (CTA) device, or the like, or any combination thereof. In some embodiments, the imaging device may include a multi-modality imaging device. Exemplary multi-modality imaging devices may include a PET-CT device, a PET-MRI device, a SPET-CT device, or the like, or any combination thereof. The multi-modality imaging device may perform multi-modality imaging simultaneously. For example, the PET-CT device may generate structural X-ray CT data and functional PET data simultaneously in a single scan. The PET-MRI device may generate MRI data and PET data simultaneously in a single scan.

In some embodiments, the imaging device may be coupled to (e.g., connected to) a service receiver (node). In some embodiments, the processing device 112A may obtain the image raw data from the imaging device that generates the image raw data or from the service receiver (node) coupled to the imaging device, one or more components (e.g., the terminal device 130, the storage device 140) of the image reconstruction system 100, or an external storage device via the network 120. In some embodiments, the processing device 112A may obtain the image raw data from the I/O 260 of the computing device 200 via the communication port 250, and/or the I/O 350 of the mobile device 300 via the communication platform 310.

In 503, the processing device 112A (e.g., the hardware resource determining module 404) may determine, based on a complexity of a reconstruction task of the image raw data and/or processing capacities of one or more workstations, from the one or more workstations, one or more hardware resources for processing the image raw data.

In some embodiments, the service receiver (node) coupled to the imaging device that generates the image raw data may have a service request or need for image reconstruction based on the image raw data. Exemplary image reconstruction may include image generation (e.g., reconstructing one or more images based on the image raw data), removing an image artifact, image registration, image fusion, image denoising, or the like, or a combination thereof. Accordingly, a reconstruction task may need to be performed. The reconstruction task may be generated by the processing device 112A (e.g., the sub task generating module 406). In some embodiments, the complexity of the reconstruction task of the image raw data may relate to an amount of the image raw data. For example, if the amount of the image raw data is relatively large, the complexity of the reconstruction task may be relatively high. As another example, if the amount of the image raw data is relatively small, the complexity of the reconstruction task may be relatively low.

In some embodiments, the image reconstruction system 100 may include one or more workstations. Each workstation may include a plurality of hardware resources. In some embodiments, the hardware resources may be configured in a heterogeneous system architecture. In some embodiments, the hardware resources may include one or more Central Processing Units (CPU), one or more Graphics Processing Units (GPU), one or more Field Programmable Gate Arrays (FPGA), and/or one or more Application-Specific Integrated Circuits (ASIC), etc. In some embodiments, different workstations may have different hardware resources. For example, different workstations may have different amounts and/or types of hardware resources. In some embodiments, the hardware resources of a workstation may include one or more modularized hardware resources, and/or one or more non-modularized hardware resources. A modularized hardware resource may refer that the hardware resource is modularized. For example, a modularized CPU may refer that the CPU is configured as a plurality of modularized or standardized processing sub units or blocks. A non-modularized hardware resource may refer that the hardware resource is not modularized.

In some embodiments, hardware resources may include local hardware resources of the service receiver (node), remote hardware resources of one or more service providers (nodes). In some embodiments, a workstation that provides a remote hardware resource of a service provider (node) may be coupled to an imaging device with a same model number as the first imaging device, or an imaging device with a different model number from the first imaging device. In some embodiments, the hardware resources may be provided by or one or more manufacturers (e.g., a first manufacturer of the first imaging device, a second manufacturer different from the first manufacturer). In some embodiments, the hardware resources provided by the first manufacturer of the first imaging device may be modularized. In some embodiments, the hardware resources provided by the second manufacturer may be non-modularized. In some embodiments, different workstations (or hardware resources) may be owned by a same owner, or owned by different owners.

In some embodiments, each hardware resource may have a processing capacity. In some embodiments, each workstation may have a processing capacity, and the processing capacity of the each workstation may be determined based on the processing capacities of the hardware resources of the each workstation. In some embodiments, the processing capacity of a hardware resource may be standardized (also referred to as a standardized processing capacity), and accordingly, the processing capacity of a workstation may be standardized. More descriptions of the processing capacity may be found elsewhere in the present disclosure (e.g., FIG. 6 and descriptions thereof).

In some embodiments, the processing device 112A may determine, based on the complexity of the reconstruction task of the image raw data and/or processing capacities of one or more workstations, from the one or more workstations, one or more hardware resources for processing the image raw data. In some embodiments, the processing device 112A may determine, based on an evaluation rule for matching the complexity of the reconstruction task of the image raw data and the processing capacities of one or more workstations, the one or more hardware resources. In some embodiments, the processing device 112A may determine hardware resources whose processing capacities match the complexity of the reconstruction task of the image raw data according to a preset rule (also referred to as a matching rule). For example, the complexity of the reconstruction task may be quantified, and the preset rule may indicate a relationship between the complexity of the reconstruction task and processing capacities needed to realize the reconstruction task. The relationship may be denoted by a table, a function, a fitted curve, etc. In some embodiments, the processing device 112A may select, according to the matching rule, from one or more workstations of the image reconstruction system 100, hardware resources whose processing capacities are sufficient to accomplish the reconstruction task. In some embodiments, a summation of processing capacities of the selected hardware resources (or a portion thereof) may match the complexity of the reconstruction task of the image raw data.

In some embodiments, the processing device 112A may determine processing capacities of local resources (e.g., local hardware resources) of the service receiver (node). In some embodiments, the processing device 112A may determine whether the processing capacities of local resources match the complexity of the reconstruction task. In some embodiments, in response to a determination that the processing capacities of local resources match the complexity of the reconstruction task, the processing device 112A may designate at least a portion of the local resources as the hardware resources for processing the image raw data. In some embodiments, in response to a determination that the processing capacities of local resources mismatch the complexity of the reconstruction task, the processing device 112A may designate the local resources as a portion of the hardware resources for processing the image raw data. In some embodiments, if the processing capacities of local resources is surplus to the required processing capacity of the reconstruction task, the local resources (or a portion thereof) may be further used to provide another reconstruction service (or a portion thereof) (i.e., the service receiver (node) may be used as a service provider (node) of another reconstruction service (or a portion thereof)).

In some embodiments, the processing device 112A may determine processing capacities of a plurality of remote resources. For example, the processing device 112A may obtain the processing capacities of the plurality of remote resources from one or more processing devices 112B. In some embodiments, the processing device 112A may determine, based on the processing capacities of the plurality of remote resources, one or more candidate remote resources (of one or more service providers (nodes)) whose processing capacities match the complexity of the reconstruction task. In some embodiments, the processing device 112A may determine, from one or more candidate remote resources, one or more target remote resources based on availabilities of the one or more candidate remote resources, accessibilities of the one or more candidate remote resources, processing capacities of the one or more candidate remote resources, network resource states (over the image reconstruction service platform), or service prices of the one or more candidate remote resources. In some embodiments, the processing device 112A may designate at least a portion of the one or more target remote resources as the one or more hardware resources for processing the image raw data. In some embodiments, the network resource states may include a type of network, transmission bandwidths between the one or more candidate remote resources and a computing device of the service receiver (node), and/or transmission delays from the one or more candidate remote resources to the computing device of the service receiver (node). In some embodiments, the network resource states (e.g., the transmission bandwidths and/or transmission delays) may be determined through a handshaking mechanism. In some embodiments, the processing device 112A may determine processing capacities of a plurality of remote resources; determine, based on the processing capacities of the plurality of remote resources, one or more target remote resources whose processing capacities match the complexity of the reconstruction task; and designate at least a portion of the one or more target remote resources as the one or more hardware resources for processing the image raw data. In some embodiments, the processing device 112A may determine, from the plurality of remote resources, the one or more target remote resources based on availabilities of the plurality of remote resources, accessibilities of the plurality of remote resources, processing capacities of the plurality of remote resources, network resource states, and/or service prices of the plurality of remote resources. In some embodiments, the network resource states (over the image reconstruction service platform) may include a type of the network, transmission bandwidths between one or more remote resources and a computing device of the service receiver (node), and/or transmission delays from one or more remote resources to the computing device of the service receiver (node).

In some embodiments, the processing device 112A may give priority to the use of local resources. For example, if the local resources (or a portion thereof) are available, the processing device 112A may designate the local resources (or a portion thereof) as at least a portion of the hardware resources. If the processing capacities of the local resources mismatch the complexity of the reconstruction task (e.g., the processing capacities of the local resources are not sufficient to accomplish the reconstruction task), the processing device 112A may designate remote resources as another portion of the hardware resources. In this case, both the local resources and the remote resources may be used to accomplish the reconstruction task.

In some embodiments, the processing device 112A may determine the hardware resources (e.g., local resources, remote resources) according to a dynamic price of each hardware resource, a current network resource state (e.g., a transmission bandwidth, a transmission delay), the availability and/or accessibility of the each hardware resource, and/or the processing capacity of the each hardware resource. For example, if a service price of the local resources is higher than a service price of remote resources, the processing device 112A may designate the remote resources whose service price is lower than the local resources as the hardware resources for accomplishing the reconstruction task. In this case, the local resources may be sold for other reconstruction service(s) to save cost.

In 505, the processing device 112A (e.g., the sub task generating module 406) may generate, based on the image raw data and/or the one or more hardware resources, one or more sub tasks of the reconstruction task.

In some embodiments, the processing device 112A may generate the sub task(s) according to a predetermined sub task generation algorithm, a preset sub task generation rule, etc. In some embodiments, each sub task may include image raw data that is used in the sub task. For example, the processing device 112A may determine an image reconstruction program used to implement the reconstruction task; parse or analyze the image reconstruction program; generate a plurality of image reconstruction program units (e.g., a first unit for filtered back projection, a second unit for iterative processing, etc.) based on the image reconstruction program; and generate the sub task(s) based on the plurality of image reconstruction program units (e.g., packaging one or more of the plurality of image reconstruction program units into a sub task). As another example, the processing device 112A may divide the image raw data into one or more portions; determine an image reconstruction program used to process each portion of the image raw data; and generate a sub task based on the image reconstruction program for each portion of the image raw data.

In some embodiments, the processing device 112A may determine a number (or count) of the sub tasks and/or a task load of each of the sub tasks, based on the amount of the image raw data, a number (or count) of the hardware resources, a processing capacity of each of the hardware resources. In some embodiments, the processing device 112A may generate the sub tasks based on the image raw data, the number (or count) of the sub tasks, and/or the task load of each of the sub tasks.

In some embodiments, the processing device 112A may determine the number (or count) of the sub tasks based on the image raw data (e.g., the amount of the image raw data). In some embodiments, the processing device 112A may determine the number (or count) of the hardware resources based on the number (or count) of the sub tasks. In some embodiments, the processing device 112A may determine the processing capacities of the hardware resources based on the task loads of the sub tasks. For example, each sub task may correspond to a hardware resource, and/or the processing capacity of each hardware resource may match the task load of a corresponding sub task. For instance, the processing device 112A may generate three sub tasks (e.g., sub task A, sub task B, sub task C) based on the image raw data, and may then determine the hardware resources whose processing capacitates match the task loads of the three sub tasks.

In 507, the processing device 112A (e.g., the assigning module 408) may assign the one or more sub tasks to the one or more hardware resources.

In some embodiments, the processing device 112A may assign the one or more sub tasks to the one or more hardware resources, based on the processing capacity of each hardware resource, the number (or count) of the sub tasks, task loads of the sub tasks, priorities of the sub tasks, and/or any other requirement relating to the sub tasks (e.g., a delivery deadline of each sub task, a budget of each sub task, etc.). In some embodiments, the processing device 112A may determine at least one hardware resource of the one or more hardware resources for implementing each sub task. In some embodiments, the processing capacities of the at least one hardware resource may match the each sub task. For example, if the processing capacities of hardware resources of three workstations (e.g., workstation D, workstation E, workstation F) match three sub tasks (e.g., sub task A, sub task B, sub task C), respectively, then the processing device 112A may assign sub task A to the hardware resource(s) of workstation D, assign sub task B to the hardware resource(s) of workstation E, and assign sub task C to the hardware resource(s) of workstation F. In some embodiments, the processing device 112A may transmit the one or more sub tasks and image raw data relating to the sub tasks to the corresponding hardware resource(s) (or to the corresponding service provider (node(s)) coupled to the corresponding hardware resource(s)), so that the corresponding hardware resource(s) may implement the sub task(s) and generate intermediate result(s) of the sub task(s).

In some embodiments, the processing device 112A may assign, according to an allocation strategy, the one or more sub tasks to the one or more hardware resources. In some embodiments, the allocation strategy may include a minimum processing time strategy, a minimum service price strategy, or a strategy preset by a user. For example, if the processing capacity of hardware resources of each of the three workstations (e.g., workstation D, workstation E, workstation F) match each of the three sub tasks (e.g., sub task A, sub task B, sub task C), the processing device 112A may determine a plurality of assigning plans (e.g., assigning sub tasks A/B/C to workstations D/E/F (or D/F/E, or E/D/F, or E/F/D, or F/D/E, or F/E/D) in sequence) and prices corresponding to the plurality of assigning plans, select an assigning plan that has a lowest price, and assign the sub tasks according to the selected assigning plan. As another example, if the processing capacity of hardware resources of each of the three workstations (e.g., workstation D, workstation E, workstation F) match each of the three sub tasks (e.g., sub task A, sub task B, sub task C), the processing device 112A may determine a plurality of assigning plans (e.g., assigning sub tasks A/B/C to workstations D/E/F (or D/F/E, or E/D/F, or E/F/D, or F/D/E, or F/E/D) in sequence) and a total processing time of the sub tasks corresponding to each of the assigning plans, select an assigning plan that has a minimum processing time, and assign the sub tasks according to the selected assigning plan.

In 509, the processing device 112A (e.g., the obtaining module 402) may obtain one or more intermediate results corresponding to the one or more sub tasks. The one or more intermediate results may be generated by the one or more hardware resources.

In some embodiments, after the processing device 112A transmits the one or more sub tasks and image raw data relating to the sub tasks to the corresponding hardware resource(s) (or to the corresponding service provider (node(s)) coupled to the corresponding hardware resource(s)), the corresponding hardware resource(s) may implement the sub task(s) and generate intermediate result(s) of the sub task(s). In some embodiments, the corresponding hardware resource(s) (or the corresponding service provider (node(s)) coupled to the corresponding hardware resource(s)) may transmit the intermediate result(s) to the processing device 112A.

In 511, the processing device 112A (e.g., the reconstruction result generating module 410) may generate, based on the one or more intermediate results, a reconstruction result of the image raw data.

In some embodiments, each of the one or more intermediate results may be a portion of the reconstruction result. In some embodiments, the processing device 112A may generate the reconstruction result by combining the one or more intermediate results. For example, an intermediate result may correspond to a processing result of a portion of the image raw data, and the one or more intermediate results may be combined to obtain the reconstruction result of the image raw data. Exemplary combining operations may include splicing, fusing, etc. In some embodiments, at least a portion of the intermediate results may be further processed, and the processed result(s) and/or the intermediate result(s) may be combined to obtain the reconstruction result. In some embodiments, the reconstruction result may be generated based on one or more reconstruction algorithms, and the intermediate results may be intermediate results used in the reconstruction algorithms. Exemplary reconstruction algorithms may include an analytic reconstruction algorithm, an iterative reconstruction algorithm, a Fourier-based reconstruction algorithm, or the like, or any combination thereof. Exemplary analytic reconstruction algorithms may include a Filter Back Projection (FBP) algorithm, a Back-Projection Filter (BPF) algorithm, or the like, or any combination thereof. Exemplary iterative reconstruction algorithms may include a Maximum Likelihood Expectation Maximization (ML-EM), an Ordered Subset Expectation Maximization (OSEM), a Row-Action Maximum Likelihood Algorithm (RAMLA), a Dynamic Row-Action Maximum Likelihood Algorithm (DRAMA), or the like, or any combination thereof. Exemplary Fourier-based reconstruction algorithm may include a classical direct Fourier algorithm, a Non-Uniform Fast Fourier Transform (NUFFT) algorithm, or the like, or any combination thereof.

It should be noted that the above description is merely provided for the purpose of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more operations may be added elsewhere in the process 500. For example, operations 503 and 505 may be integrated into a single operation.

FIG. 6 is a flowchart illustrating an exemplary process for image reconstruction according to some embodiments of the present disclosure. In some embodiments, process 600 may be executed by the image reconstruction system 100. For example, the process 600 may be implemented as a set of instructions (e.g., an application) stored in a storage device (e.g., the storage device 140, the disk 270, and/or the storage 390). In some embodiments, the processing device 112B (e.g., the processor 220 of the computing device 200, the CPU 340 of the mobile device 300, and/or one or more modules illustrated in FIG. 4B) may execute the set of instructions and may accordingly be directed to perform the process 600. The operations of the illustrated process presented below are intended to be illustrative. In some embodiments, the process 600 may be accomplished with one or more additional operations not described and/or without one or more of the operations discussed. Additionally, the order of the operations of process 600 illustrated in FIG. 6 and described below is not intended to be limiting.

In 601, the processing device 112B (e.g., the processing capacity determining module 414) may determine, according to a capacity quantization standard, processing capacities of local resources.

In some embodiments, the local resources may refer to the hardware resources of a workstation that is coupled to a service provider (node) (the processing device 112B may be implemented on the computing device of the service provider (node)). In some embodiments, the image reconstruction system 100 may include a plurality of service providers (or nodes), and the processing device 112B coupled to each service provider (node) may determine, the processing capacities of local resources of the workstation of the each service provider (node). In some embodiments, the processing device 112B may determine the processing capacities of local resources in response to a service request of the processing device 112A.

In some embodiments, the processing device 112B may determine, according to the capacity quantization standard, the processing capacities of local resources. The capacity quantization standard may refer to a criterion or rule for quantifying the processing capacities of local resources. In some embodiments, the capacity quantization standard may be determined by the image reconstruction system 100, or may be preset by a user or operator via the terminal(s) 130.

In some embodiments, the processing device 112B may determine the processing capacities of local resources based on a bearing capacity of each of the local resources for each of a plurality of types of image reconstruction units of a plurality of image reconstruction algorithms. In some embodiments, a plurality of image reconstruction algorithms or programs that may be used in image reconstruction task may be predetermined. In some embodiments, the plurality of image reconstruction algorithms or programs may be divided into a plurality of types of image reconstruction units. In some embodiments, the plurality of types of image reconstruction units may be standardized according to a predetermined standard. For example, a first type of image reconstruction unit may be configured for image addition, a second type of image reconstruction unit may be configured for matrix multiplication, a third type of image reconstruction unit may be configured for image subtraction, etc. In some embodiments, each local resource may have a bearing capacity for each type of image reconstruction unit (e.g., the local resource may have the bearing capacity to implement certain number (or count) of image reconstruction units). In some embodiments, the processing capacity of each local resource may be determined based on the bearing capacities of the each local resource for the plurality of types of image reconstruction units. For example, the processing capacity of each local resource may be determined as a summation (e.g., a weighted sum) of the bearing capacities of the each local resource for the plurality of types of image reconstruction units. For instance, if the bearing capacity of a local resource for a first type of image reconstruction unit is 100 (i.e., 100 units in a unit time period), the bearing capacity of the local resource for a second type of image reconstruction unit is 150 (i.e., 150 units in a unit time period), the bearing capacity of the local resource for a third type of image reconstruction unit is 200 (i.e., 200 units in a unit time period), then the processing capacity of the local resource may be determined as 450 units (or a weighted sum thereof). In some embodiments, the bearing capacities of each local resource for the plurality of types of image reconstruction units may be normalized before summation.

In 603, the processing device 112B (e.g., the transmitting module 418) may provide the processing capacities for an image reconstruction service platform.

In some embodiments, the processing device 112B may transmit the processing capacities of local resources determined in 601 to the image reconstruction service platform (or a service receiver (node) on which the image reconstruction service platform is implemented). In some embodiments, the processing device 112A may determine processing capacities of local resources (i.e., the hardware resources of a workstation that is coupled to a service receiver (node), on whose computing device the processing device 112A is implemented) and provide the processing capacities for the image reconstruction service platform.

In 605, the processing device 112B (e.g., the obtaining module 412) may receive one or more sub tasks and image raw data relating to the one or more sub tasks from the image reconstruction service platform.

In some embodiments, if one or more sub tasks are assigned to the processing device 112B (or the service provider (node) to which the processing device 112B is coupled), the processing device 112B may receive the sub tasks and image raw data relating to the sub tasks from the image reconstruction service platform.

In 607, the processing device 112B (e.g., the intermediate result generating module 416) may generate one or more intermediate results by performing, based on the image raw data, the one or more sub tasks.

In some embodiments, after the processing device 112B (or the service provider (node) to which the processing device 112B is coupled) receives the sub tasks and image raw data relating to the sub tasks from the image reconstruction service platform, the processing device 112B may perform the sub tasks based on the received image raw data, and generate corresponding intermediate results. In some embodiments, each sub task may correspond to an intermediate result. In some embodiments, if two or more processing devices 112B receives sub tasks and corresponding image raw data, the two or more processing devices 112B may generate corresponding intermediate results.

In 609, the processing device 112B (e.g., the transmitting module 418) may provide the one or more intermediate results for the image reconstruction service platform.

In some embodiments, the processing device 112B (or the service provider (node) to which the processing device 112B is coupled) may transmit the one or more intermediate results to the image reconstruction service platform (or the service receiver (node) on which the image reconstruction service platform is implemented). In some embodiments, if two or more processing devices 112B generate corresponding intermediate results, each of the two or more processing devices 112B may transmit corresponding intermediate result(s) to the image reconstruction service platform (or the service receiver (node) on which the image reconstruction service platform is implemented).

It should be noted that the above description is merely provided for the purpose of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more operations may be added elsewhere in the process 600. For example, operations 601 and 603 may be integrated into a single operation. In some embodiments, the processing device 112B may determine a service price based on the processing capacities, and/or network resource states over the image reconstruction service platform. In some embodiments, the network resource states may include a type of the network, transmission bandwidths between the local resources and the image reconstruction service platform, and/or transmission delays from the local resources to the image reconstruction service platform, etc. In some embodiments, the processing device 112B may determine the service price dynamically. In some embodiments, the processing device 112B may provide the service price for the image reconstruction service platform (e.g., transmit the service price to the image reconstruction service platform). In some embodiments, the processing device 112B may provide availabilities and/or accessibilities of the local resources for the image reconstruction service platform (e.g., transmit the availabilities and/or accessibilities to the image reconstruction service platform).

Figure 7:
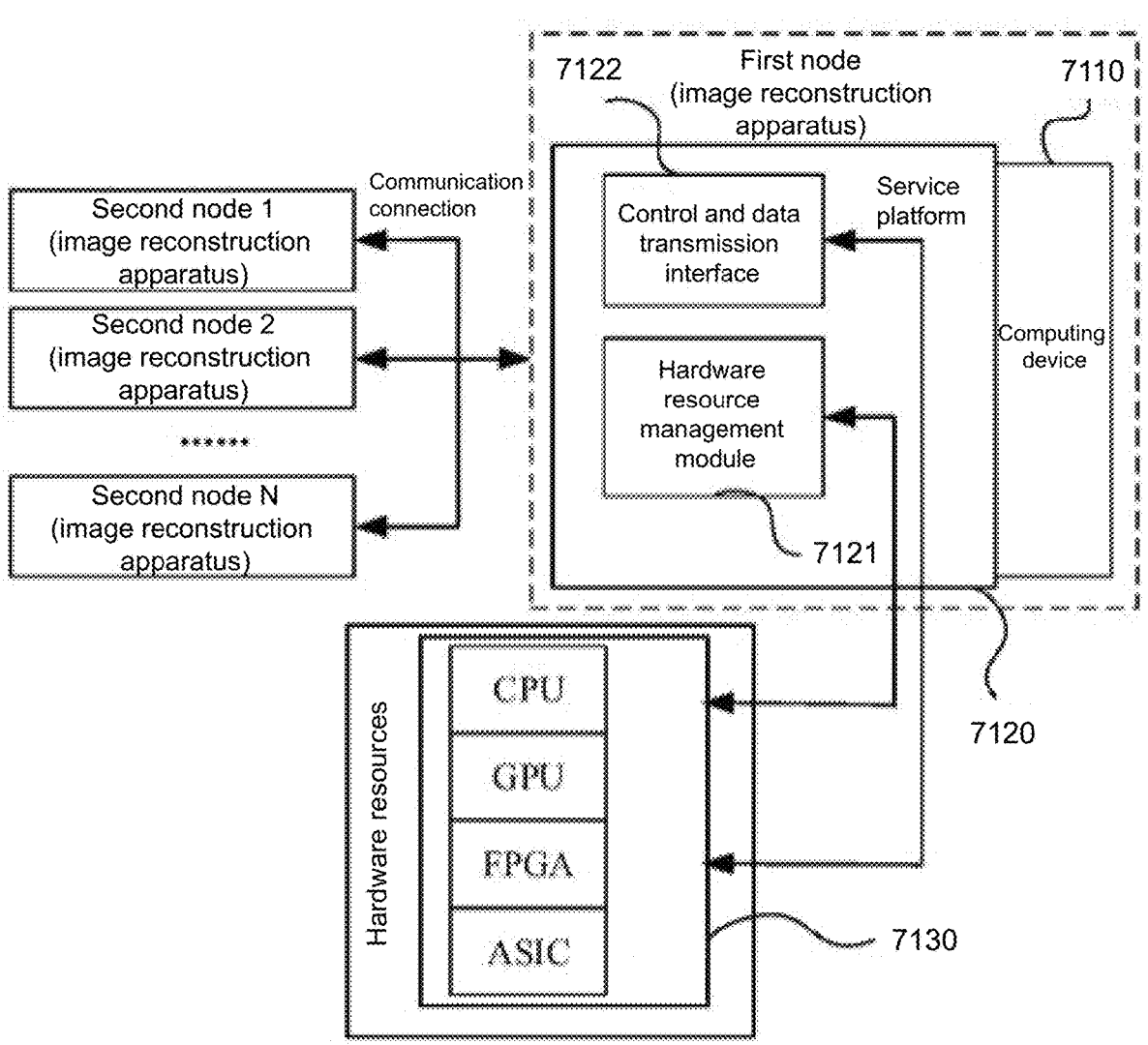
FIG. 7 is a block diagram illustrating an exemplary image reconstruction apparatus according to some embodiments of the present disclosure.

FIG. 7 is a block diagram illustrating an exemplary image reconstruction apparatus according to some embodiments of the present disclosure. The image reconstruction apparatus 700 may be used for a distributed system that is configured for image reconstruction and sharing processing capacities.

As shown in FIG. 7, the image reconstruction apparatus 700 may include a computing device 7110 (also referred to as a console computer) and a service platform 7120 (also referred to as an image reconstruction service platform) implemented on the console computer. In some embodiments, the service platform 7120 may include a hardware resource management module 7121, and a control and data transmission interface 7122. In some embodiments, the hardware resource management module 7121 may be configured to determine (e.g., calculate), according to a capacity quantization standard, first processing capacities (also referred to as first standardized processing capacities) of hardware resources (at its disposal) available for the service platform, and/or feed back (or provide) the first processing capacities to the service platform. In some embodiments, the control and data transmission interface 7122 may be configured to receive one or more first sub tasks (also referred to as reconstruction sub tasks) and first image raw data, generate one or more first intermediate results corresponding to the one or more first sub tasks, and provide the one or more first intermediate results for the service platform. In some embodiments, the first sub task(s) may include a reconstruction sub-task allocated or assigned by a second node of the distributed system, and the first image raw data may include image raw data transmitted from the second node. In some embodiments, the distributed system may include a first node that may act as a slave node in the distributed system. In some embodiments, the first node may only share processing capacities, and may not include a reconstruction and display module. In some embodiments, the processing capacities may be provided by a manufacturer of an imaging device that generates the first image raw data. The hardware resources may include hardware resources that the first node can acquire directly, third-party cloud hardware resources obtained via network communication, or the like, or a combination thereof. The use of the image reconstruction apparatus(es) disclosed in the present disclosure can decouple front-end data acquisition and transmission and back-end data processing into two separate parts, and a second node that has a need or request for image reconstruction can obtain processing capacities from one or more first nodes and/or one or more second nodes (e.g., second node 1, second node 2, . . . , second node N, etc.) of the distributed system for sharing processing capacities, without configuring or preparing the hardware resources of a workstation according to a peak processing capacity that may be used, thereby reducing the configuration cost of the workstation and improve the utilization rate of the hardware resources at the disposal of the first node. In some embodiments, the workstation may be coupled to (e.g., connected to) the imaging device.

In some embodiments, the image reconstruction apparatus 700 may further include a first workstation that includes hardware resources. In some embodiments, the first workstation may communicate with the hardware resource management module 7121 and the control and data transmission interface 7122, respectively. The first workstation may be configured to feed back (or provide) the first processing capacities to the hardware resource management module 7121 according to the capacity quantization standard. The first workstation may be further configured to receive, from the control and data transmission interface 7122, the first sub task(s) and the first image raw data, perform the first sub task(s) according to the first image raw data, and/or feed back (or provide) intermediate result(s) of the sub task(s).

In some embodiments, the hardware resource management module 7121 may be configured to determine, based on the hardware resources at its disposal, the first processing capacities according to the capacity quantization standard, and/or feed back (or provide) the first processing capacities. Specifically, in some embodiments, the hardware resource management module 7121 may feed back (or provide) qualities and/or availabilities of the hardware resources to the second node that is in communication the hardware resource management module 7121, according to the first processing capacities fed back by the first workstation and/or a network resource status (and/or quotation).

In some embodiments, the control and data transmission interface 7122 may obtain and feed back (or provide) the first intermediate result(s). Specifically, in some embodiments, the control and data transmission interface 7122 may receive the first intermediate result(s) fed back by the first workstation and feed back (or provide) the first intermediate result(s) to the second node.

In some embodiments, the first workstation may include a plurality of standardized hardware resources 7130 configured in a heterogeneous system architecture. In some embodiments, the capacity quantization standard may include normalizing the processing capacity of each of the plurality of standardized hardware resources 7130 based on the processing capacity characteristics of the standardized hardware resources 7130. In some embodiments, the standardized hardware resources may include, but is not limited to, one or more CPUs, one or more GPUs, one or more FPGAs, and/or one or more ASICs.

Thus, the image reconstruction apparatus in the present disclosure can realize the modularization and normalization of data processing performed on image raw data generated by different types of imaging devices, thereby facilitating mutual cooperation. For example, CT and MRI may use standardized workstations. The processing capacities of acceleration hardware resources (such as CPU, GPU, FPGA, and ASIC) in the workstation(s) may be quantified, and the hardware resources of these standardized workstations can be probed or accessed by the second node(s) of the distributed system. In this way, it is possible to realize the sharing of the processing capacities of imaging devices of the same type and/or brand, imaging devices of different types but the same brand, imaging devices of the same type but different brands, and imaging devices of different types and different brands. As a result, users who purchase various types of imaging device(s), manufacturer(s) who sell the imaging device(s), and different users who use the same brand of imaging device can cooperate with each other via a network (e.g., a high-speed 5G network) to achieve processing capacity sharing and improve the utilization rate of resources.

Figure 8:
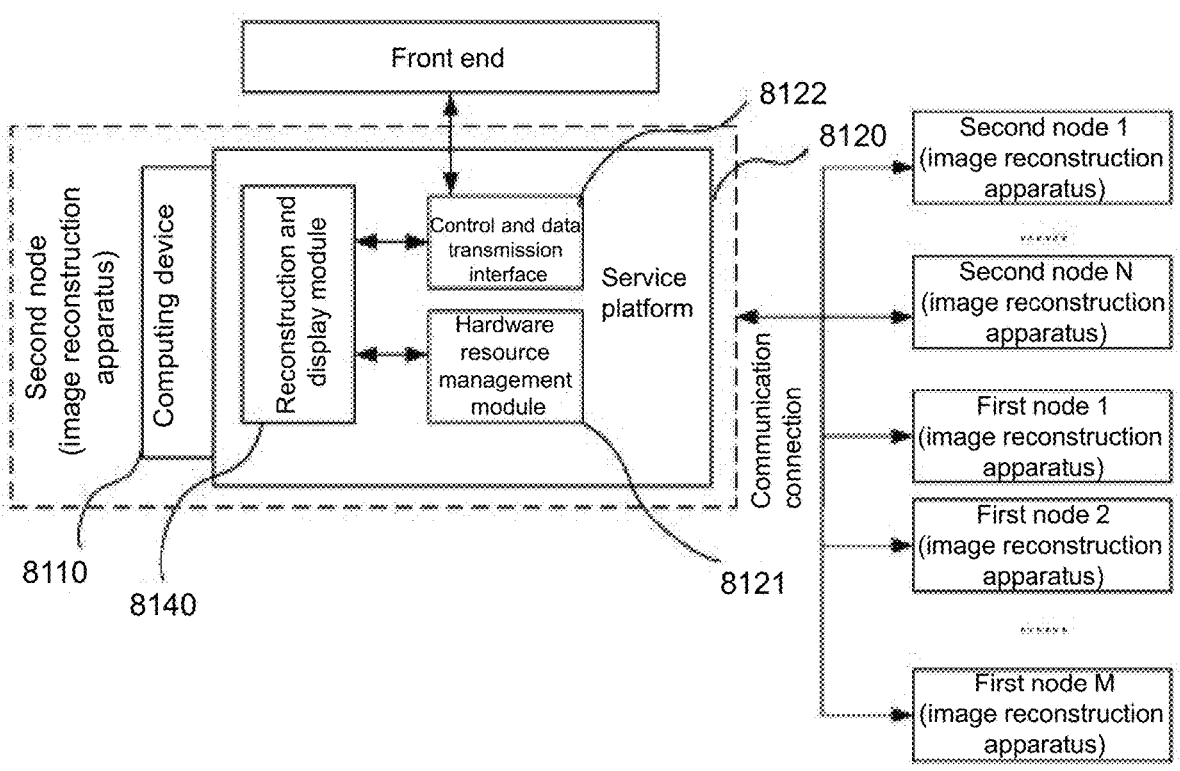
FIG. 8 is a block diagram illustrating an exemplary image reconstruction apparatus according to some embodiments of the present disclosure.

FIG. 8 is a block diagram illustrating an exemplary image reconstruction apparatus according to some embodiments of the present disclosure. As shown in FIG. 8, the image reconstruction apparatus 800 may be different from the image reconstruction apparatus 700 illustrated in FIG. 7. In some embodiments, the image reconstruction apparatus 800 may be configured as a second node of the distributed system. In some embodiments, the second node may function as a master node. In some embodiments, the second node may obtain the processing capacities of hardware resources from the distributed system. In some embodiments, the image reconstruction apparatus 800 may include a computing device 8110 (also referred to as a console computer) (similar to the computing device 7110) and a service platform 8120 (also referred to as an image reconstruction service platform) (similar to the service platform 7120) implemented on the console computer. In some embodiments, the service platform 8120 may include a hardware resource management module 8121 similar to the hardware resource management module 7121, and a control and data transmission interface 8122 similar to the control and data transmission interface 7122. In some embodiments, the image reconstruction apparatus 800 may further include a reconstruction and display module 8140 that is coupled to (e.g., connected to) or in communication with the hardware resource management module 8121 and the control and data transmission interface 8122, respectively. The control and data transmission interface 8122 may be configured to receive image raw data (e.g., second image raw data). The reconstruction and display module 8140 may be configured to determine or obtain, based on a scan task that generates the image raw data and the image raw data, processing capacities (e.g., second processing capacities) (also referred to as second standardized processing capacities) of the distributed system through the hardware resource management module 8121. In some embodiments, the reconstruction and display module 8140 may be configured to generate, according to the second processing capacities and/or the second image raw data, one or more second sub tasks of a second reconstruction task; and/or assign the second sub task(s) to the distributed system. In some embodiments, the control and data transmission interface 8122 may be further configured to receive one or more second intermediate results fed back by the distributed system and send the second intermediate result(s) to the reconstruction and display module 8140. In some embodiments, the reconstruction and display module 8140 may be further configured to generate, based on the second intermediate result(s), a second reconstruction result; and/or display the second reconstruction result on a display device of the console computer. It is understood that the display device may include, but is not limited to a processor, a displayer, an audio and video playback device, etc.

In some embodiments, the image reconstruction apparatus 800 may be similar to at least a portion of the image reconstruction apparatus 700. In some embodiments, a portion of the image reconstruction apparatus 800 may be similar to the image reconstruction apparatus 700.

In some embodiments, the hardware resource management module 8121 may be further configured to obtain a transmission delay, a transmission bandwidth, and/or a processing capacity quotation (or price) relating to the second processing capacities. In some embodiments, the reconstruction and display module 8140 may be further configured to determine an image reconstruction scheme (or a reconstruction task). Specifically, in some embodiments, the reconstruction and display module 8140 may generate the image reconstruction scheme according to a priority strategy of the second processing capacities, the transmission delay(s), the transmission bandwidth(s), and/or the second processing capacities provided by the hardware resource management module 8121. In some embodiments, the reconstruction and display module 8140 may be configured to decompose the image reconstruction scheme into one or more second sub tasks. In some embodiments, a priority strategy of processing capacities may include a time priority, a cost priority, and/or an effect priority. In some embodiments, according to the characteristics of the processing capacities of each of the first nodes (e.g., slave nodes) (e.g., first node 1, first node 2, . . . , first node M, etc.), the image reconstruction scheme may be decomposed into one or more second sub tasks. In some embodiments, the time priority, the cost priority, or the effect priority may be designated as a preset priority strategy according to the actual working conditions.

In some embodiments, the hardware resource management module 8121 of the image reconstruction apparatus 800 may be configured to feed back (or provide) the qualities and availabilities of hardware resources to a second node (or first node) that is in communication with it, based on the processing capacities (e.g., the first processing capacities, the second processing capacities) and network resource status (and/or quotation) fed back by a workstation (e.g., the first workstation, a second workstation not shown). Thus, the image reconstruction apparatus 800 may enable the manufacturer(s) of imaging device(s) to provide reconstruction processing capacities and share the processing capacities with customers through network communication (e.g., 5G network). In some embodiments, when purchasing imaging device(s), the customer(s) do not need to configure workstation(s) according to a peak processing capacity that may be used, but only need to configure workstation(s) according to the commonly used processing capacities, and purchase a small amount of processing capacities when needed. That is, it is possible to expand the types of different configurations of imaging devices that manufacturer(s) can provide. Moreover, it is possible to improve the economic benefits by sharing the reconstruction processing capacities with other customer(s) with paid. At the same time, the cost of purchasing imaging device(s) may be saved, and the utilization rate of hardware resources may be improved. Further, for the processing capacities sharing between a customer's own multiple imaging device(s) or workstation(s), and/or purchasing processing capacities from manufacturer(s) of imaging device(s) or workstation(s), the reconstruction efficiency can be improved for all imaging device(s) or workstation(s) in the distributed system over the service platform through reasonable distribution of the reconstruction sub tasks. Further, because the service platform can obtain the hardware resource configuration of the respective workstation(s), appropriate hardware resource(s) with appropriate processing capacities can be selected to better complete the reconstruction task according to different requirements of reconstruction tasks (e.g., transmission delay, transmission bandwidth, etc.). Furthermore, each of the second nodes of the distributed system may test the network bandwidth and/or delay through a handshake mechanism, and finds suitable hardware resources with suitable processing capacities. In some embodiments, the service platform may implement a dynamic bidding mechanism of processing capacities based on the qualities and/or availabilities of the processing capacities, network status(es), to provide dynamic pricing, thereby improving the applicability and flexibility of the distributed system which shares processing capacities of image reconstruction.

Figure 9:
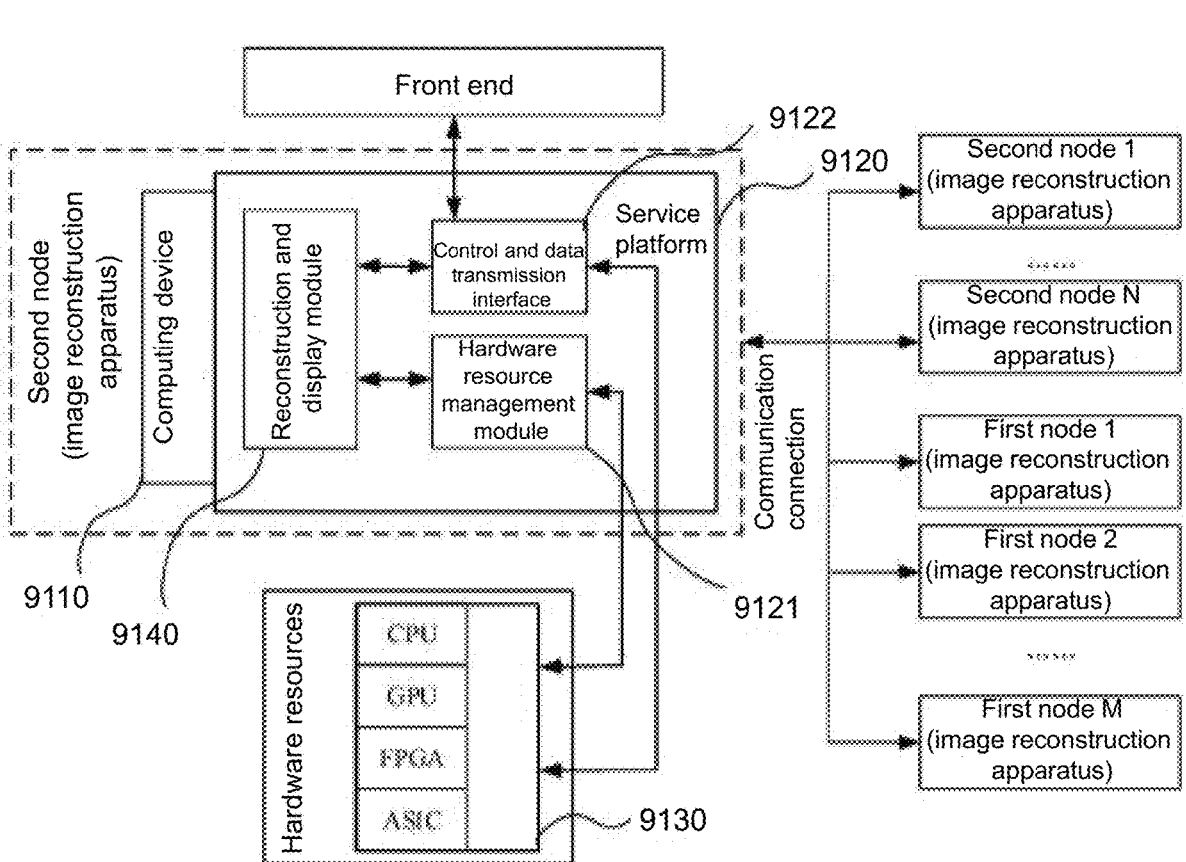
FIG. 9 is a block diagram illustrating an exemplary image reconstruction apparatus according to some embodiments of the present disclosure.

FIG. 9 is a block diagram illustrating an exemplary image reconstruction apparatus according to some embodiments of the present disclosure. As shown in FIG. 9, the image reconstruction apparatus 900 may be different from the image reconstruction apparatus 800 in that the image reconstruction apparatus 900 may further include a second workstation. In some embodiments, the second workstation may be coupled to (e.g., connected to) or in communication with the hardware resource management module 9121 and the control and data transmission interface 9122, respectively. In some embodiments, the second workstation may be configured to feed back (or provide) third processing capacities (also referred to as third standardized processing capacities) to the hardware resource management module 9121 according to the capacity quantization standard. In some embodiments, the second workstation may be further configured to receive third sub task(s) and third image raw data from the control and data transmission interface 9122; and/or perform the third sub task(s) and feed back (or provide) a third reconstruction result generated based on the third image raw data. The differences between the image reconstruction apparatus 900 and the image reconstruction apparatus 800 may be described below. In the distributed system, any of the image reconstruction apparatuses having the second workstation and/or the reconstruction and display module (e.g., the image reconstruction apparatus 900) may function as a master node when it has a local reconstruction task and needs to obtain processing capacities from the distributed system; when it provides processing capacities for another image reconstruction apparatus (e.g., the image reconstruction apparatus 800, the image reconstruction apparatus 700) in the distributed system that needs to complete a reconstruction task, it may function as a slave node.

In some embodiments, in order to obtain the second processing capacities, the hardware resource management module 9121 of the second node (as a master node) may obtain fourth processing capacities from the hardware resource management module 7121 of one or more first nodes (as slave node(s)) (e.g., first node 1, first node 2, . . . , first node M, etc.). In some embodiments, in order to obtain the second processing capacities, the hardware resource management module 9121 of the second node (as the master node) may obtain fifth processing capacities from the hardware resource management module of one or more second nodes (e.g., the current master node, other second nodes as slave nodes, or the like, or a combination thereof) (e.g., second node 1, second node 2, . . . , second node N, etc.) of the distributed system. In some embodiments, the hardware resource management module 9121 of the second node (as the master node) may obtain processing capacities from one or more first nodes (as slave nodes) and one or more second nodes (e.g., the current master node, other second nodes as slave nodes, or the like, or a combination thereof). In some embodiments, the reconstruction and display module 9140 may be further configured to generate an image reconstruction scheme and/or assign one or more second sub tasks (and/or third sub tasks) to the distributed system. In some embodiments, in order to assign the second sub task(s) (and/or third sub task(s)) to the distributed system, the reconstruction and display module 9140 may assign (or provide, transmit, or send) one or more of the second sub task(s) (and/or third sub task(s)) and corresponding image raw data (e.g., the second image raw data, or fourth image raw data) to the control and data transmission interface 9122. In some embodiments, the fourth image raw data may be a subset of the second image raw data. The control and data transmission interface 9122 of the second node may send the second sub tasks (and/or third sub tasks) and the fourth raw data to the control and data transmission interface of one or more first nodes. In some embodiments, if only one of the first nodes is needed to complete the reconstruction task, the fourth image raw data may be the same as the second image raw data.

In some embodiments, the control and data transmission interface 9122 of the second node may assign (or provide, transmit, or send) the second sub task(s) (and/or third sub task(s)) and the fourth image raw data to the control and data transmission interface of one or more second nodes of the distributed system. The control and data transmission interface 9122 may be further configured to receive one or more intermediate results (e.g., second intermediate results) fed back by the distributed system. Specifically, in some embodiments, the control and data transmission interface 9122 of the second node may receive second intermediate results fed back by the control and data transmission interface of the first node(s). In some embodiments, the control and data transmission interface 9122 of the second node may receive second intermediate results fed back by the control and data transmission interface of one or more second nodes of the distributed system.

In some embodiments, in order to assign the second sub task(s) to the distributed system, the control and data transmission interface 9122 of the second node may assign, according to the characteristics of the processing capacities of the first node(s) and/or the second node(s), second sub task(s) that match the characteristics of the processing capacities to the first node(s) and/or the second node(s).

In some embodiments, the computing device 9110 may be coupled to (e.g., connected to) one or more imaging devices, the control and data transmission interface 9122 may be further configured to receive image raw data (e.g., the second image raw data, the third image raw data, etc.). Specifically, the control and data transmission interface 9122 may receive image raw data acquired (or generated) by at least one imaging device. In some embodiments, the imaging device may include, but is not limited to, MRI and/or CT. In some embodiments, the image raw data may include a collection of one or more MRI data sets and/or a collection of one or more CT data sets.

In some embodiments, the service platform 9120 may be configured to determine an individual scanning strategy for each of the imaging device(s) according to a property of each of the imaging device(s). In some embodiments, the individual scanning strategy may be adaptive to a displaying interface of the computing device 9110. Thus, the service platform can configure different scanning strategies according to the self-adaptive displaying interface, thereby achieving better image display effects.

In some embodiments, the hardware resources may include nonstandard resources 9130 that are configured in a heterogeneous system architecture and are in communication with the hardware resource management module 9121. In some embodiments, the nonstandard resources 9130 may be configured to evaluate processing capacities of its hardware resources based on test case(s) provided by the hardware resource management module 9121. In some embodiments, the hardware resource management module 9121 may be further configured to obtain sixth processing capacities of the nonstandard resources 9130 based on the capacity quantization standard. In some embodiments, the nonstandard resources 9130 may be further configured to receive fourth sub task(s) from the control and data transmission interface 9122, and feed back (or provide) fourth intermediate result(s) corresponding to the fourth sub task(s) to the control and data transmission interface 9122. In some embodiments, the image reconstruction apparatus(es) provided by the present disclosure can be coupled with (e.g., connected with) other brand(s) of image device(s) or workstation(s) with processing capacities through the control and data transmission interface. Therefore, the distributed system may be an open sharing system for sharing processing capacities between image device(s) of the same brand, and between image devices of different brands or manufacturers. In some embodiments, the manufacturer(s) of the workstation(s) or the imaging device(s), can also join the distributed system as the first node and/or the second node through the control and data transmission interface after installing the service platform, accepting processing capacity evaluation test(s) and passing corresponding certification(s). Further, each of the first node(s) and the second node(s) added to the service platform may have a unique ID, therefore, the distributed system of the present disclosure may not only provide a platform for sharing processing capacities but also provide a platform for sharing image information.

It should be noted that the above description is merely provided for the purpose of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, the service platform of all nodes in the distributed system may include three modules: the control and data transmission interface, the hardware resource management module, and reconstruction and display module. For the master node, the reconstruction and display module may perform sub task allocation (or assigning) and reconstruction result generation (e.g., image synthesis). For a slave node, the reconstruction and display module may not be implemented or may not exist. Further, a master node and a slave node may be convertible, and a node that has a local task may function as the master node. In some embodiments, if a node does not have a workstation at all, it can only function as the master node, because it cannot function as a slave node and provide processing capacities to other master node(s). In some embodiments, a slave node may serve multiple master nodes at the same time. For any reconstruction task, there may be only one master node and one or more slave nodes.

Figure 10:
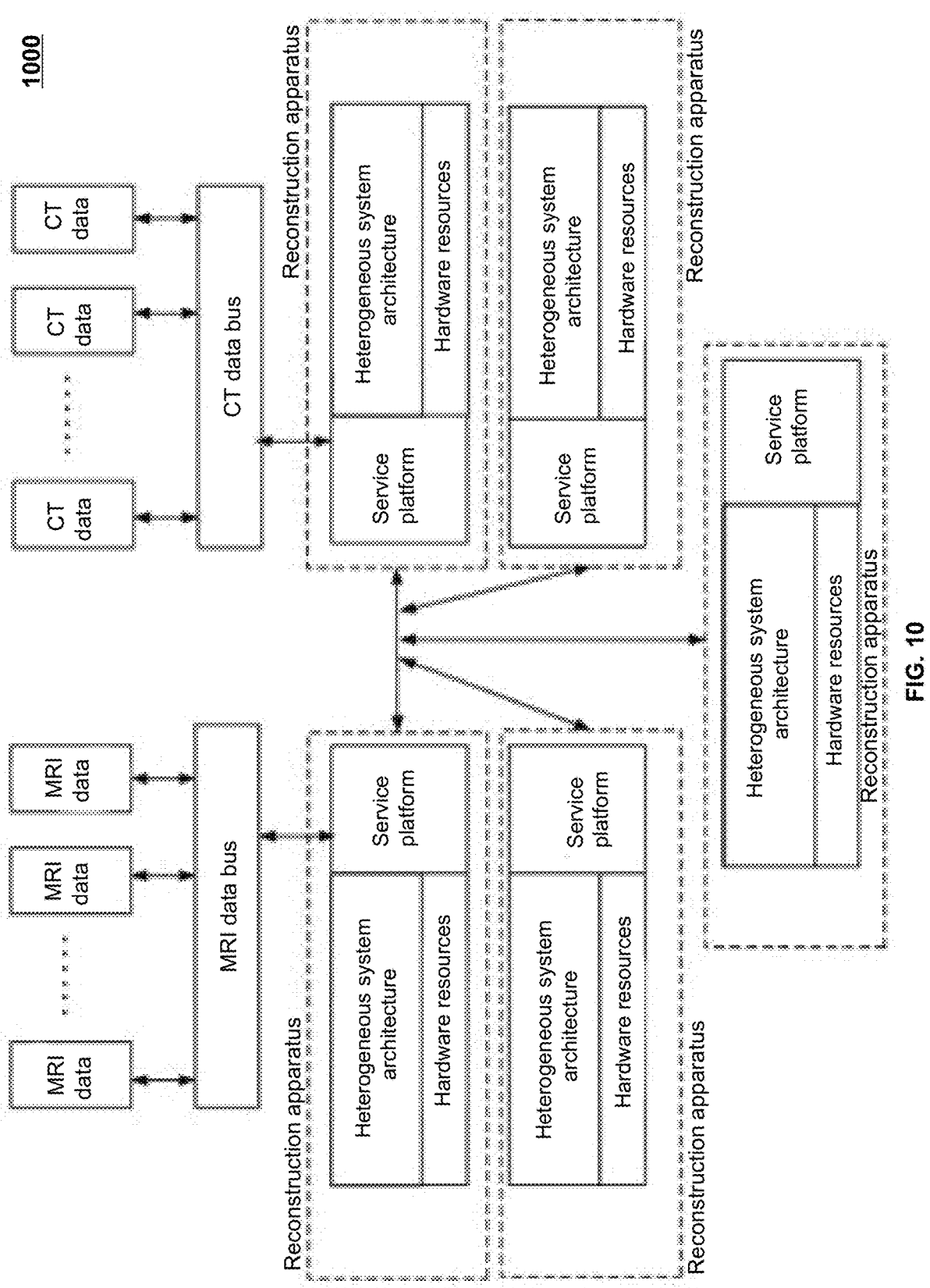
FIG. 10 is a block diagram illustrating an exemplary distributed system for image reconstruction according to some embodiments of the present disclosure.
Figure 11:
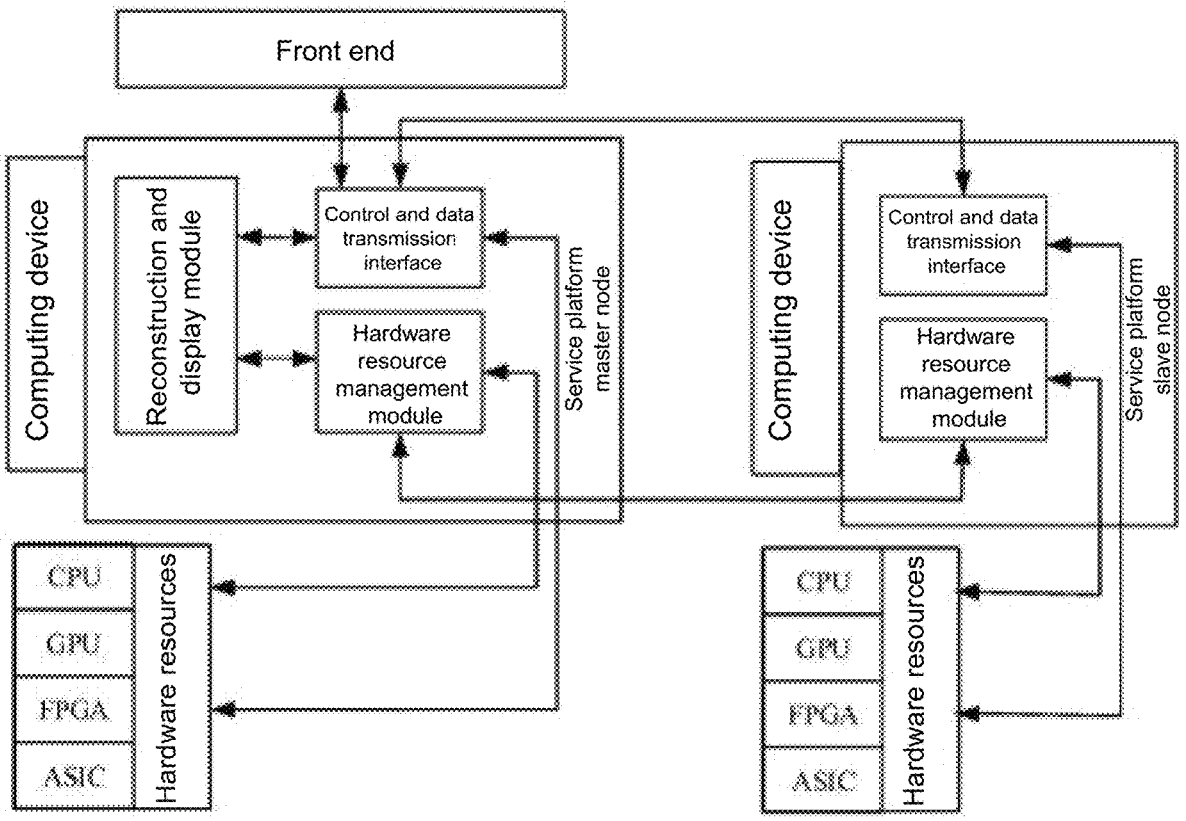
FIG. 11 is a block diagram illustrating an exemplary service platform and a heterogeneous system architecture of hardware resources of a distributed system according to some embodiments of the present disclosure.
Figure 12:
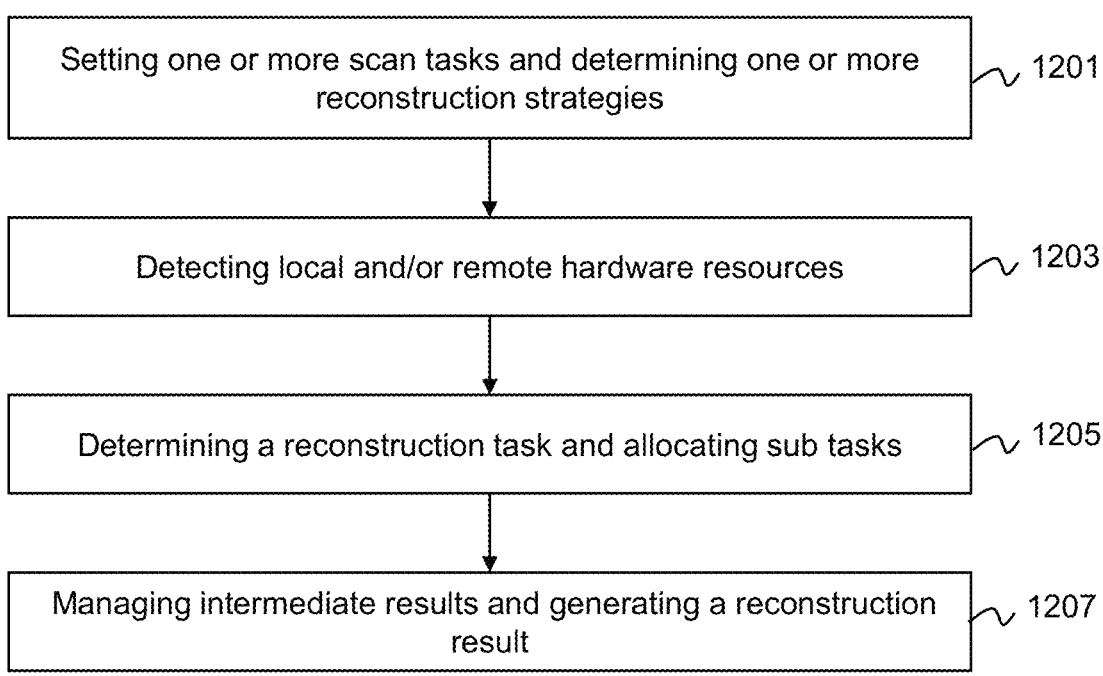
FIG. 12 is a flowchart illustrating an exemplary process for image reconstruction according to some embodiments of the present disclosure.
Figure 13:
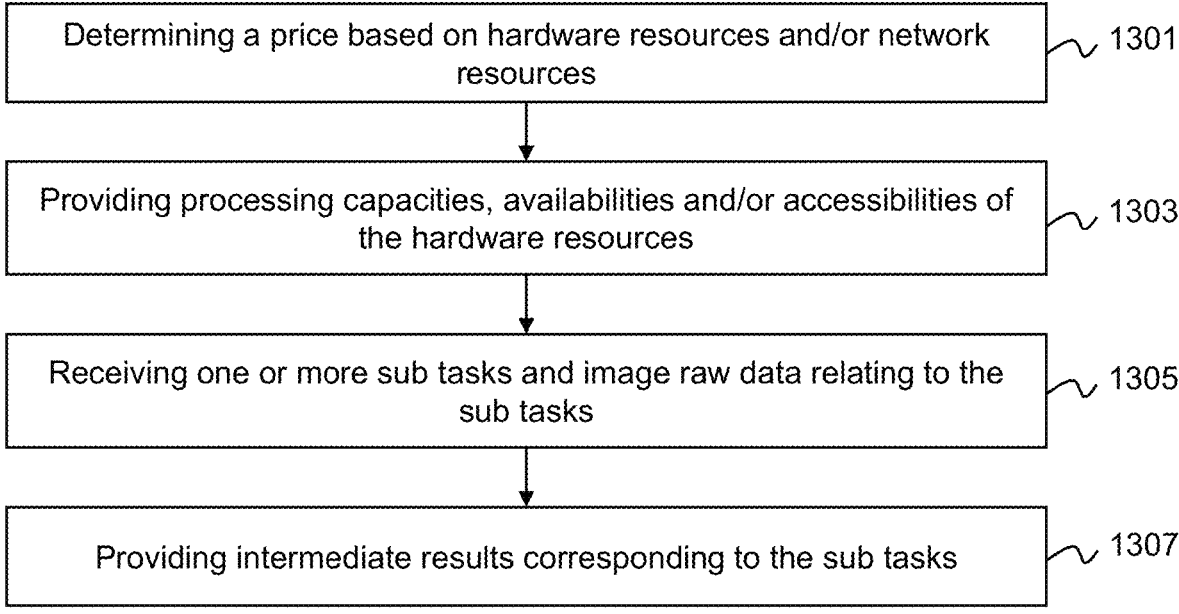
FIG. 13 is a flowchart illustrating an exemplary process for image reconstruction according to some embodiments of the present disclosure.

FIG. 10 is a block diagram illustrating an exemplary distributed system for image reconstruction according to some embodiments of the present disclosure. FIG. 11 is a block diagram illustrating an exemplary service platform and a heterogeneous system architecture of hardware resources of a distributed system according to some embodiments of the present disclosure. FIG. 12 is a flowchart illustrating an exemplary process for image reconstruction according to some embodiments of the present disclosure. FIG. 13 is a flowchart illustrating an exemplary process for image reconstruction according to some embodiments of the present disclosure. As shown in FIG. 10, the distributed system 1000 may include at least two second nodes that are in communication with each other or at least one second node and one or more first nodes that are in communication with each other. In some embodiments, the first node may include or be an image reconstruction apparatus 700, 800 or 900. The second node may include or be an image reconstruction apparatus 800 or 900. In some embodiments, a second node may also be referred to as a master node of a service platform or a master node, and the first node may also be referred to as a slave node of the service platform or a slave node.

In some embodiments, the second node that has a need or request for image reconstruction (also referred to as target second node) may be configured to obtain processing capacities of one or more of the first node(s) and/or one or more of the second node(s) based on the received image raw data and/or the scan task (or information relating to the scan task) that generates the image raw data. In some embodiments, the second node may be further configured to generate an image reconstruction scheme (and/or one or more sub takes thereof) and/or assign the sub task(s) to one or more of the first node(s) and/or one or more of the second node(s) according to the processing capacities and/or the image raw data. The first node(s) and/or the second node(s) receiving the sub task(s) may generate intermediate result(s) corresponding to the sub task(s) and feed back (or provide) the intermediate result(s). The second node that has the need or request for image reconstruction (or the target second node) may be further configured to obtain the intermediate result(s), generate a reconstruction result according to the intermediate result(s), and/or display on a display device of the console computer.

In some embodiments, each of the first node(s) and the second node(s) may have a unique ID in the distributed system. With this configuration, the distributed system provided by the present disclosure can not only provide or serve as a platform for sharing processing capacities but also provide or serve as a platform for sharing image information.

According to the distributed system described in the present disclosure, the hardware resources of the image reconstruction apparatus(es) can be configured in a heterogeneous system architecture according to the computing requirements and/or actual working conditions, so as to realize the modularization of the hardware resources and/or the software programs, make the service platform evaluate processing capacities of the hardware resources accurately, and allocate image reconstruction sub tasks as required. The software implemented on different image reconstruction apparatus(es) is configured as a service platform. In some embodiments, the service platform may be general or universal, and may assign (or transmit), according to the available hardware resources, the sub task(s) through the network (e.g., a 5G network) to obtain the intermediate result(s). The manufacturer of the imaging device and/or other users can share processing capacities with paid through the 5G network. For workstations or hardware resources from other manufacturers, although the standardization degree of the workstations or hardware resources is relatively low, and can only be evaluated and certified for limited processing capacities, they can join the distributed system for sharing processing capacities if they are willing to use the general data interface provided by the service platform.

One of the scenarios of the distributed system for image reconstruction with shared processing capacities may be described below. As shown in FIG. 11, the service platform may be installed on the computing device (also referred to as the console computer). The console computer may be coupled to (e.g., connected to) or in communication with the front-end interface of an imaging device. For different imaging devices (e.g., MRI and CT), different scanning strategies may be determined through the adaptive graphical interface (or displaying interface) of the service platform. The image raw data generated in scanning is received through the control and data transmission interface provided by the console computer, which is different from the traditional way(s) to receive data from a workstation. The master node (i.e., the master node of reconstruction, (e.g., the second node)) of the service platform may assign at least a portion of image raw data to the slave node (i.e., the slave node of reconstruction, (e.g., the first node)) of the service platform. The slave node of the service platform may receive the at least a portion of the image raw data from the master node to perform corresponding sub tasks. Further, the service platform on the console computer may perform management functions of hardware resources. The reconstruction operations (e.g., reconstruction sub tasks) may be implemented on the hardware resources of the local master node and/or the hardware resources of other slave nodes over the network. In some embodiments, most of these hardware resources may be standardized and configured in a heterogeneous system architecture. In some embodiments, different hardware resources may be good at performing different sub tasks. The hardware resource management module of the service platform may detect available hardware resources, determine the latency of these hardware resources, transmission bandwidth(s) and/or price(s) of these hardware resources, and provide information for the reconstruction and display module to generate an appropriate reconstruction scheme. The hardware resource management module of the master node may obtain this information by communicating with the corresponding module of the slave node through a handshake mechanism. For non-standardized hardware resources, the service platform may provide test case(s) to evaluate the hardware resources. The slave node(s) may provide service quotation(s) according to the network status and its own resource quality.

The service platform of the master node may run the reconstruction and display module. The reconstruction and display module may generate a reconstruction scheme, based on information of the hardware resources obtained by the hardware resource management module, and/or the characteristics of the current reconstruction task. In some embodiments, users may select various schemes such as a time priority scheme, a cost priority scheme, a default scheme, etc. In some embodiments, different sub tasks (together with relevant image raw data) may be allocated according to different hardware resource characteristics, and transmitted to the local master node and/or slave node(s) through the control and data transmission interface. The node(s) that receive the sub task(s) may perform received sub tasks and generate intermediate result(s). The intermediate result(s) may be used to generate a reconstruction result. The reconstruction result may be displayed on the display device of the master node.

Specifically, as shown in FIG. 12, during image reconstruction, the second node may: in 1201, set one or more scan tasks, and determine one or more reconstruction strategies; in 1203, detect local and/or remote hardware resources; in 1205, determine or generate, according to the hardware resources that can be obtained, a reconstruction scheme, and/or one or more sub task(s) of the reconstruction scheme, and allocate the sub tasks; in 1207, receive (or manage) intermediate result(s) corresponding to the sub task(s), generate a reconstruction result (e.g., a reconstructed image) based on the intermediate result(s), and display the reconstruction result. Correspondingly, as shown in FIG. 7, during image reconstruction, the first node may: in 1301, determine a price based on hardware resources and/or network resources; in 1303, feed back (or provide) processing capacities, availabilities and/or accessibilities of the hardware resources (e.g., through a handshake mechanism); in 1305, receive sub task(s) and related image raw data; in 1307, feed back (or provide) intermediate result(s) corresponding to the sub task(s).

It should be noted that in a certain scenario, a node of the distributed system can be used as the first node, and in another scenario, the node can be used as the second node, which is not limited to the present disclosure. Further, those skilled in the art will understand that in some cases, a node may have its own hardware resources (e.g., it has a workstation) that can match the sub task(s) generated by the node itself. In some embodiments, the node may have dual attributes of the first node and the second node at the same time. Further, the present disclosure does not limit the number of the second nodes that share processing capacities with the first node(s) at the same time. That is, at the same time, according to the utilization of hardware resources and the need for image reconstruction, the first node may provide processing capacities for multiple second nodes.

Since the distributed system for image reconstruction provided by the present disclosure includes the image reconstruction apparatus(es) provided by the present disclosure, it has at least the same beneficial effects as the image reconstruction apparatus(es), and will not be repeated herein.

FIG. 14 is a flowchart illustrating an exemplary process for image reconstruction according to some embodiments of the present disclosure. FIG. 15 is a flowchart illustrating an exemplary process for image reconstruction according to some embodiments of the present disclosure. FIG. 16 is a flowchart illustrating an exemplary process for image reconstruction according to some embodiments of the present disclosure. In some embodiments, the distributed system for image reconstruction may include M first nodes and N second nodes that are in communication with each other, wherein $M \geq 1$ and $N \geq 1$, or $M=0$ and $N \geq 2$. As shown in FIG. 14, the image reconstruction process may include one or more of the following operations.

In 1401, the second node that has a need or request for image reconstruction (also referred to as a target second node), may obtain processing capacities of one or more nodes of the M first nodes and/or the N second nodes based on received image raw data and corresponding scan task(s).

In 1403, the target second node may generate, based on the processing capacities and the image raw data, a recon-struction task (or an image reconstruction scheme) including one or more sub tasks, and assign (or allocate) the sub task(s) to the one or more nodes.

In 1405, the one or more nodes that receive the sub task(s) may perform the sub task(s), generate one or more interme-diate results of the one or more sub tasks, and feed back (or provide) the intermediate result(s) to the target second node.

In 1407, the target second node may generate a recon-structed image of the image raw data based on the interme-diate result(s).

In some embodiments, in operation 1405 illustrated in FIG. 14, the slave node may perform operations according to the process 1500 of FIG. 15. As shown in FIG. 13, during the image reconstruction process, the node (i.e., the first node and/or the second node) may receive the sub task(s) and perform one or more of the following operations.

In 1501, the node may determine, based on the hardware resources at its disposal, and/or according to the capacity quantization standard, first processing capacities of hard-ware resources, and provide the first processing capacities for the image reconstruction service platform.

In 1503, the node may receive one or more first sub tasks and first image raw data relating to the first sub task(s), generate one or more intermediate results by performing, based on the first image raw data, the first sub task(s), and provide the intermediate result(s) for the image reconstruc-tion service platform. In some embodiments, the first sub task(s) may include a sub task assigned by the second node of the distributed system. In some embodiments, the first image raw data may include image raw data sent by (or transmitted from) the second node.

In some embodiments, in operation 1405 illustrated in FIG. 14, the master node may perform operations according to the process 1600 of FIG. 16. As shown in FIG. 16, during the image reconstruction process, the target second node may perform one or more of the following operations.

In 1601, the target second node may obtain second processing capacities of the distributed system based on second image raw data and corresponding scan task(s).

In 1603, the target second node may generate, based on the second image raw data and the second processing capacities, a second reconstruction task including one or more second sub tasks, and assign the one or more second sub tasks to one or more nodes.

In 1605, the target second node may generate, based on one or more second intermediate results generated from the one or more second sub tasks, a reconstructed image of the second image raw data, and display the reconstructed image.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exem-plary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appre-ciated that two or more references to "an embodiment" or "one embodiment" or "an alternative embodiment" in vari-ous portions of this specification are not necessarily all referring to the same embodiment. Furthermore, the particu-lar features, structures or characteristics may be combined as suitable in one or more embodiments of the present disclo-sure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer read-able media having computer readable program code embod-ied thereon.

A computer readable signal medium may include a propa-gated data signal with computer readable program code embodied therein, for example, in baseband or as part of a carrier wave. Such a propagated signal may take any of a variety of forms, including electro-magnetic, optical, or the like, or any suitable combination thereof. A computer read-able signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in a com-bination of one or more programming languages, including an object oriented programming language such as Java, Scala, Smalltalk, Eiffel, JADE, Emerald, C++, C#, VB. NET, Python or the like, conventional procedural program-ming languages, such as the "C" programming language, Visual Basic, Fortran 2103, Perl, COBOL 2102, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Each of the patents, patent applications, publications of patent applications, and other material, such as articles, books, specifications, publications, documents, things, and/ or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A method for image reconstruction, which is implemented on a computing device including at least one processor and at least one storage device, comprising:
    obtaining image raw data;
    determining, based on a complexity of a reconstruction task of the image raw data and processing capacities of one or more workstations, from the one or more workstations, one or more hardware resources for processing the image raw data;
    generating, based on the image raw data and the one or more hardware resources, a plurality of sub tasks of the reconstruction task;
    assigning the plurality of sub tasks to the one or more hardware resources;
    obtaining a plurality of intermediate results corresponding to the plurality of sub tasks, the plurality of intermediate results being generated by the one or more hardware resources; and
    generating, based on the plurality of intermediate results, a reconstruction result of the image raw data.

2. The method of claim 1, wherein the one or more hardware resources include at least one of a modularized hardware resource, or a non-modularized hardware resource.

3. The method of claim 1, wherein
    the image raw data is generated by a first imaging device; and
    the one or more hardware resources are provided by at least one of a first manufacturer of the first imaging device, or a second manufacturer different from the first manufacturer.

4. The method of claim 1, wherein the determining one or more hardware resources for processing the image raw data comprises:
    determining, based on an evaluation rule for matching the complexity of the reconstruction task of the image raw data and the processing capacities of one or more workstations, the one or more hardware resources.

5. The method of claim 4, wherein the determining one or more hardware resources comprises:
    determining processing capacities of local resources;
    determining whether the processing capacities of local resources match the complexity of the reconstruction task; and
    in response to a determination that the processing capacities of local resources match the complexity of the reconstruction task, designating at least a portion of the local resources as the one or more hardware resources for processing the image raw data; or
    in response to a determination that the processing capacities of local resources mismatch the complexity of the reconstruction task, designating the local resources as a portion of the one or more hardware resources for processing the image raw data.

6. The method of claim 4, wherein the determining one or more hardware resources comprises:
    determining processing capacities of a plurality of remote resources;
    determining, based on the processing capacities of the plurality of remote resources, one or more target remote resources whose processing capacities match the complexity of the reconstruction task; and
    designating at least a portion of the one or more target remote resources as the one or more hardware resources for processing the image raw data.

7. The method of claim 6, wherein the determining, based on the processing capacities of the plurality of remote resources, one or more target remote resources whose processing capacities match the complexity of the reconstruction task comprises:
    determining, from the plurality of remote resources, the one or more target remote resources based on at least one of availabilities of the plurality of remote resources, accessibilities of the plurality of remote resources, processing capacities of the plurality of remote resources, network resources, or service prices of the plurality of remote resources.

8. The method of claim 1, wherein the assigning the plurality of sub tasks to the one or more hardware resources comprises:
    assigning, according to an allocation strategy, the plurality of sub tasks to the one or more hardware resources, the allocation strategy including a minimum processing time strategy, a minimum service price strategy, or a strategy preset by a user.

9. The method of claim 1, wherein the image reconstruction includes at least one of image generation, removing an image artifact, image registration, or image fusion.

10. A method for image reconstruction, which is implemented on a computing device including at least one processor and at least one storage device, comprising:
    determining, according to a capacity quantization standard, processing capacities of local resources;
    providing the processing capacities for an image reconstruction service platform;
    receiving a plurality of sub tasks and image raw data relating to the plurality of sub tasks from the image reconstruction service platform;
    generating a plurality of intermediate results by performing, based on the image raw data, the plurality of sub tasks; and
    providing the plurality of intermediate results for the image reconstruction service platform.

11. The method of claim 10, wherein the determining processing capacities of local resources comprises:
    determining the processing capacities of local resources based on a bearing capacity of each of the local resources for each of a plurality of types of image reconstruction units of a plurality of image reconstruction algorithms.

12. The method of claim 10, further comprising:
    determining a service price based on at least one of the processing capacities, or network resource states over the image reconstruction service platform; and providing the service price for the image reconstruction service platform.

13. The method of claim 10, further comprising:

providing availabilities and/or accessibilities of the local resources for the image reconstruction service platform.

14. A system for image reconstruction, comprising:

an image reconstruction service platform;

a plurality of service receiver nodes; and a plurality of service provider nodes;

wherein the image reconstruction service platform is configured to:

obtain, from at least one of the plurality of service receiver nodes, image raw data;

determine, based on a complexity of a reconstruction task of the image raw data, processing capacities of the plurality of service receiver nodes, and processing capacities of the plurality of service provider nodes, from the plurality of service receiver nodes and the plurality of service provider nodes, one or more hardware resources for processing the image raw data;

determine, based on the image raw data and the one or more hardware resources, a plurality of sub tasks of the reconstruction task;

assign the plurality of sub tasks to the one or more hardware resources;

obtain a plurality of intermediate results corresponding to the plurality of sub tasks, the plurality of intermediate results being generated by the one or more hardware resources; and generate, based on the plurality of intermediate results, a reconstruction result of the image raw data.

15. The system of claim 14, wherein each of the plurality of service provider nodes is configured to:

determine, according to a capacity quantization standard, processing capacities of resources of the each service provider node;

provide the processing capacities for the image reconstruction service platform;

receive at least one of the plurality of sub tasks and at least a portion of the image raw data relating to the at least one sub task from the image reconstruction service platform;

generate at least one intermediate result by performing, based on the at least a portion of the image raw data, the at least one sub task; and provide the at least one intermediate result for the image reconstruction service platform.

16. The system of claim 14, wherein the system is a distributed system.

17. The system of claim 16, wherein the image reconstruction service platform is implemented on the at least one of the plurality of service receiver nodes.

18. The system of claim 14, wherein the image reconstruction service platform is configured as a cloud computing platform.

19. The method of claim 1, wherein the determining one or more hardware resources for processing the image raw data comprises:

determining processing capacities of local resources;

determining whether the processing capacities of local resources match the complexity of the reconstruction task; and in response to a determination that the processing capacities of local resources match the complexity of the reconstruction task, designating at least a portion of the local resources as the one or more hardware resources for processing the image raw data; or in response to a determination that the processing capacities of local resources mismatch the complexity of the reconstruction task, designating the local resources as a portion of the one or more hardware resources for processing the image raw data.

20. The method of claim 1, wherein the determining one or more hardware resources for processing the image raw data comprises:

determining processing capacities of a plurality of remote resources;

determining, based on the processing capacities of the plurality of remote resources, one or more target remote resources whose processing capacities match the complexity of the reconstruction task; and designating at least a portion of the one or more target remote resources as the one or more hardware resources for processing the image raw data.

* * * * *